United States Patent [19]

Nazif et al.

[11] Patent Number: 5,481,601
[45] Date of Patent: Jan. 2, 1996

[54] SYSTEM AND METHOD FOR CREATING, TRANSFERING, AND MONITORING SERVICES IN A TELECOMMUNICATION SYSTEM

[75] Inventors: Zaher A. Nazif, High Bridge; Subramanya K. Shastry, Middletown; Susan K. K. Man, Holmdel; Edith H. Chu, Branchburg; Francis Y. Chu, Highland Park; Gregory M. Fisher, North Brunswick; Mohammad S. Nassirpour, Westfield, all of N.J.

[73] Assignee: Bell Communications Research Inc., Livingston, N.J.

[21] Appl. No.: 408,442

[22] Filed: Mar. 17, 1995

Related U.S. Application Data

[63] Continuation of Ser. No. 305,859, Sep. 14, 1994, abandoned, which is a continuation of Ser. No. 972,529, Nov. 6, 1992, abandoned, which is a continuation-in-part of Ser. No. 934,240, Aug. 25, 1992, abandoned.

[51] Int. Cl.$^6$ ............................ H04M 3/42; H04M 11/00; H04M 15/00; H04M 7/00
[52] U.S. Cl. .............................. 379/207; 379/94; 379/127; 379/230
[58] Field of Search ............................... 379/94, 112, 127, 379/142, 201, 207, 230

[56] References Cited

U.S. PATENT DOCUMENTS

| | | |
|---|---|---|
| Re. 31,319 | 7/1983 | Fraser . |
| 2,957,047 | 10/1960 | Wennemer . |
| 3,564,149 | 2/1971 | Funk et al. . |
| 3,576,398 | 4/1971 | Dejean et al. . |
| 3,691,301 | 9/1972 | Zarouni . |

(List continued on next page.)

FOREIGN PATENT DOCUMENTS

| | | |
|---|---|---|
| 879364 | 8/1971 | Canada . |
| 1008956 | 4/1977 | Canada . |
| 1015857 | 8/1977 | Canada . |
| 1052472 | 4/1979 | Canada . |
| 1063704 | 10/1979 | Canada . |
| 1078048 | 5/1980 | Canada . |
| 1120164 | 3/1982 | Canada . |
| 1129054 | 8/1982 | Canada . |
| 1149916 | 7/1983 | Canada . |
| 1169597 | 6/1984 | Canada . |
| 1169985 | 6/1984 | Canada . |
| 1177981 | 11/1984 | Canada . |
| 1184637 | 3/1985 | Canada . |
| 1191920 | 8/1985 | Canada . |
| 1204881 | 5/1986 | Canada . |
| 1216349 | 1/1987 | Canada . |
| 1219325 | 3/1987 | Canada . |

(List continued on next page.)

OTHER PUBLICATIONS

Fredrik Ljungblom, "A Service Management System for the Intelligent Network", Ericsson Review No. 1, 1990, pp. 32–41.

*Primary Examiner*—Jeffery Hofsass
*Assistant Examiner*—Harry S. Hong
*Attorney, Agent, or Firm*—Leonard Charles Suchyta; Joseph Giordano

[57] ABSTRACT

A system for creating, transferring, and monitoring services in a telecommunication system includes a service creation and management application and a service execution application. Services are created as call processing records, each call processing record comprises call processing nodes, branches and call variables. An interface specification is provided which permits the creation and management application to communicate with the execution application at a high level. Call processing records, data, and management information to be exchanged between the creation and management application and the execution application are encoded in accordance with the interface specification to permit the effective and efficient communication between the two applications and to permit the system to activate, monitor, trace, audit, and manage telecommunication services.

15 Claims, 6 Drawing Sheets

U.S. PATENT DOCUMENTS

| | | |
|---|---|---|
| 3,867,582 | 2/1975 | Weed et al. . |
| 3,881,060 | 4/1975 | Connell et al. . |
| 3,931,476 | 1/1976 | Matthews . |
| 3,934,095 | 1/1976 | Matthews et al. . |
| 3,938,091 | 2/1976 | Atalla et al. . |
| 3,978,456 | 8/1976 | Moran . |
| 4,054,756 | 10/1977 | Comella et al. . |
| 4,068,099 | 1/1978 | Mikkola et al. . |
| 4,093,819 | 6/1978 | Saito et al. . |
| 4,119,805 | 10/1978 | Pratelli . |
| 4,139,739 | 2/1979 | von Meister et al. . |
| 4,156,114 | 5/1979 | McLean . |
| 4,162,377 | 7/1979 | Mearns . |
| 4,191,860 | 3/1980 | Weber ................................. 379/115 |
| 4,232,199 | 11/1980 | Boatwright et al. . |
| 4,277,649 | 7/1981 | Sheinbein . |
| 4,310,726 | 1/1982 | Asmuth . |
| 4,313,035 | 1/1982 | Jordan et al. . |
| 4,332,980 | 6/1982 | Reynolds et al. . |
| 4,338,495 | 7/1982 | Bloch et al. . |
| 4,345,116 | 8/1982 | Ash et al. . |
| 4,348,554 | 9/1982 | Asmuth . |
| 4,371,758 | 2/1983 | Ulrich . |
| 4,436,962 | 3/1984 | Davis et al. . |
| 4,479,196 | 10/1984 | Ferrer et al. . |
| 4,520,235 | 5/1985 | Morikawa et al. . |
| 4,538,031 | 8/1985 | Benning et al. . |
| 4,545,043 | 10/1985 | Anderson et al. . |
| 4,555,594 | 11/1985 | Friedes et al. . |
| 4,556,972 | 12/1985 | Chan et al. . |
| 4,577,066 | 3/1986 | Bimonte et al. . |
| 4,596,010 | 6/1986 | Beckner et al. . |
| 4,611,094 | 9/1986 | Asmuth et al. ................. 379/201 |
| 4,653,090 | 3/1987 | Hayden ............................ 379/204 |
| 4,656,624 | 4/1987 | Collins et al. . |
| 4,665,514 | 5/1987 | Ching et al. . |
| 4,688,214 | 8/1987 | DeWitt et al. . |
| 4,695,977 | 9/1987 | Hansen et al. . |
| 4,713,806 | 12/1987 | Oberlander et al. . |
| 4,720,850 | 1/1988 | Oberlander et al. . |
| 4,723,273 | 2/1988 | Diesel et al. . |
| 4,737,983 | 4/1988 | Frauenthal et al. . |
| 4,740,955 | 4/1988 | Litterer et al. . |
| 4,747,127 | 5/1988 | Hansen et al. ................... 379/94 |
| 4,756,020 | 7/1988 | Fodale . |
| 4,763,356 | 8/1988 | Day, Jr. et al. . |
| 4,782,506 | 11/1988 | Sevcik . |
| 4,782,517 | 11/1988 | Bernardis et al. ............. 379/201 |
| 4,782,519 | 11/1988 | Patel et al. ..................... 379/221 |
| 4,794,642 | 12/1988 | Arbabzadah et al. ......... 379/200 |
| 4,811,378 | 3/1989 | Else et al. . |
| 4,827,404 | 5/1989 | Barstow et al. ............... 395/500 |
| 4,835,683 | 5/1989 | Phillips et al. ................. 395/11 |
| 4,837,799 | 6/1989 | Prohs et al. . |
| 4,860,204 | 8/1989 | Gendron et al. .............. 395/140 |
| 4,873,682 | 10/1989 | Irwin et al. . |
| 4,878,240 | 10/1989 | Lin et al. ........................ 379/67 |
| 4,893,310 | 1/1990 | Robertson et al. . |
| 4,897,866 | 1/1990 | Majmudar et al. . |
| 4,899,373 | 2/1990 | Lee et al. ....................... 379/207 |
| 4,902,469 | 2/1990 | Watson et al. ................. 376/259 |
| 4,930,154 | 5/1990 | Bauer et al. . |
| 4,942,540 | 7/1990 | Black et al. . |
| 4,953,204 | 8/1990 | Cuschleg, Jr. et al. . |
| 4,972,453 | 11/1990 | Daniel, III et al. ............. 379/10 |
| 4,989,176 | 1/1991 | Khan . |
| 5,008,929 | 4/1991 | Olsen et al. . |
| 5,012,511 | 4/1991 | Hanle et al. ................... 379/211 |
| 5,019,961 | 5/1991 | Addesso et al. ............... 364/192 |
| 5,022,067 | 6/1991 | Hughes .......................... 379/95 |
| 5,027,345 | 6/1991 | Littlewood et al. . |
| 5,029,158 | 7/1991 | Reid et al. . |
| 5,054,054 | 10/1991 | Pessia et al. . |
| 5,056,134 | 10/1991 | Bauer et al. . |
| 5,060,255 | 10/1991 | Brown ........................... 379/67 |
| 5,067,149 | 11/1991 | Schneid et al. . |
| 5,084,813 | 1/1992 | Ono ............................... 395/700 |
| 5,095,505 | 3/1992 | Finucane et al. ............. 379/201 |
| 5,097,528 | 3/1992 | Gursahaney et al. . |
| 5,136,585 | 8/1992 | Nizamuddin et al. . |
| 5,136,631 | 8/1992 | Einhorn et al. . |
| 5,241,588 | 8/1993 | Babson, III et al. .......... 379/94 X |

FOREIGN PATENT DOCUMENTS

| | | |
|---|---|---|
| 1221444 | 5/1987 | Canada . |
| 1228659 | 10/1987 | Canada . |
| 1237804 | 6/1988 | Canada . |
| 1237805 | 6/1988 | Canada . |
| 1248616 | 1/1989 | Canada . |
| 1249382 | 1/1989 | Canada . |
| 1252861 | 4/1989 | Canada . |
| 1253241 | 4/1989 | Canada . |
| 1253939 | 5/1989 | Canada . |
| 1253986 | 5/1989 | Canada . |
| 1253987 | 5/1989 | Canada . |
| 1254978 | 5/1989 | Canada . |
| 1254980 | 5/1989 | Canada . |
| 1258548 | 8/1989 | Canada . |
| 1262272 | 10/1989 | Canada . |
| 1270337 | 6/1990 | Canada . |
| 1273088 | 8/1990 | Canada . |
| 1273089 | 8/1990 | Canada . |
| 2002018 | 8/1990 | Canada . |
| 2011562 | 10/1990 | Canada . |
| 1277016 | 11/1990 | Canada . |
| 1277791 | 12/1990 | Canada . |
| 2024245 | 4/1991 | Canada . |
| 2033880 | 7/1991 | Canada . |
| 1288154 | 8/1991 | Canada . |
| 1287925 | 8/1991 | Canada . |
| 1290431 | 10/1991 | Canada . |
| 1293830 | 12/1991 | Canada . |
| 1295750 | 2/1992 | Canada . |
| 1297565 | 3/1992 | Canada . |
| 2052105 | 4/1992 | Canada . |
| 1305773 | 7/1992 | Canada . |
| 1310390 | 11/1992 | Canada . |
| 1311286 | 12/1992 | Canada . |
| 2062102 | 12/1992 | Canada . |

FIG. 5A

| EXTENSION (502) | TELEPHONE NUMBER (504) |
|---|---|
| 1002 | (101) 555-1234 |
| 1004 | (901) 555-5678 |
| 4069 | (901) 501-5555 |

| | | | |
|---|---|---|---|
| 508 | NAME | EXTENSION | TELEPHONE NUMBER |
| 510 | DATATYPE | NUMERIC STRING | TELEPHONE |
| 512 | MAXIMUM LENGTH | 4 | 15 |
| 514 | KEY | YES | NO |

| | |
|---|---|
| 516 | HEADER |
| 506 | TABLE SPECIFICATION |
| 500 | TABLE DATA |

518

SYSTEM AND METHOD FOR CREATING, TRANSFERING, AND MONITORING SERVICES IN A TELECOMMUNICATION SYSTEM

This application is a continuation of application Ser. No. 08/305859, filed on Sep. 14, 1994, now abandoned, which is a continuation of application Ser. No. 07/972,529, filed Nov. 6, 1992, now abandoned, which is a continuation-in-part application of U.S. patent application Ser. No. 07/934,240, entitled "System and Method for Creation, Transferring, and Monitoring Services In A Telecommunication System," by Zee A. Nazif et al., filed Aug. 25, 1992, now abandoned.

DESCRIPTION

System and Method For Creating, Transferring, And Monitoring Services In A Telecommunication System This application includes an Appendix describing an Interface Specification that is copyrighted subject matter of Bell Communications Research. A limited license is granted to anyone who requires a copy of the Interface Specification for purposes of understanding or analyzing the present invention, but no license is granted to make a copy for any other purposes, including making, using, or selling the claimed invention.

CROSS REFERENCE TO RELATED APPLICATION

This application is related to U.S. Pat. No. 5,241,588, entitled "Systems and Processes Providing Programmable or Customized Customer Telephone Information Services," by Ely et al.; U.S. Pat. No. 5,345,380, entitled "Systems and Processes Specifying Customized Customer Telecommunication Services Using a Graphical Interface," by Ely et al.; U.S. patent application Ser. No. 629,390, entitled "Systems and Processes for Visualizing Execution of Customer Services," by Ely et al., now abandoned; U.S. Pat. No. 5,242,580, entitled "Systems and Processes for Validating Customer Services," by Babson; U.S. Pat. No. 5,315,646, entitled "Systems and Processes for Providing Multiple Interfaces for Telephone Services," by Ely et al. Each of the foregoing applications was filed on Dec. 18, 1990. The contents of each of the foregoing patent applications ("the incorporated patent applications") is hereby incorporated by reference.

This application is also related to U.S. Pat. No. 5323,452, entitled "Visual Programming of Telephone Network Call Processing Logic," by B. N. Dickman et al., filed on Dec. 18, 1990;

This application is also related to U.S. Pat. No. 5,450,480, entitled "A Method of Creating a Telecommunication Service Specification," by Susan K. K. Man, et al., bearing attorney docket number 657; U.S. Pat. No. 5,455,853, entitled "A Method of Creating A Telecommunication Service Template," by Kathleen D. Cebulka, et al., bearing attorney docket number 658; U.S. patent. application Ser. No. 07/972,502, entitled "A Method of Creating and Accessing Value Tables In A Telecommunication Service Creation and Execution Environment," by Subramanya K. Shastry, et al., bearing attorney docket number 659; U.S. patent application Ser. No. 07/972,504, entitled "A Method of Creating and Implementing Administrative Call Processing Procedures," by Zaher A. Nazif, et al., bearing attorney docket number 656, now abandoned; U.S. Pat. No. 5,463,682, entitled "A Method of Creating User-Defined Call Processing Procedures," by Gregory M. Fisher, et al., bearing attorney docket number 662; and U.S. Pat. No. 5,442,690, entitled "A Telecommunication Service Record Structure and Method of Creation," by Zaher A. Nazif, et al., bearing attorney docket number 660. Each of the foregoing six patent applications has been filed concurrently herewith. The contents of the each of the foregoing six patent applications is hereby incorporated by reference.

BACKGROUND OF THE INVENTION

The present invention relates generally to the field of providing and maintaining customized services, and more specifically to the problem of providing and maintaining customized telecommunication services.

The incorporated patent applications each describe a system and method for creating and executing customized telecommunication services tailored to subscribers' needs. The system of the incorporated patent applications includes a service creation environment for creating customized telephone services and a service execution environment for executing the telephone services. The service creation environment includes a graphical user interface which permits an operator to build a displayed graphical representation of a desired service using "nodes," "decision boxes," and "branches." Each node represents a high level instruction for the execution of the service. The displayed graphical representation of the service is translated to a binary representation and stored as a call processing record (CPR). CPRs are transmitted from a creation environment to an execution environment where they are executed during call processing operations to return call processing instructions to inquiring switches.

The system and method for creating and executing customized telephone services described in the incorporated patent applications are described as being implemented in the Advanced Intelligent Telephone Network (AIN).

FIG. 1 illustrates an overview of the AIN. The AIN comprises System Service Points (SSPs) 30, 35, 40, and 45, Signal Transfer Points (STPs) 48 and 50, Service Control Points (SCPs) 10 and 20, and Service Management Systems (SMS) 60. SSPs are central office switching systems which receive telephone calls from telephones 12. Each SSP recognizes a variety of "triggers" within customer telephone call signals and generates queries to SCPs based on the triggers. The SSPs then process customer calls in response to commands received from the SCPs.

The SCPs communicate with the SSPs over a common-channel-signalling (CCS) network 67 that includes STPs 48 and 50. The CCS network 67 employs communications channels separate from channels used to transport customer voice signals and includes a packet-switching system. The CCS network 67 switches data in packets instead of allocating circuits for the duration of a call. The STPs 48 and 50 provide the packet-switching functions.

Each SCP is fault tolerant, because each SCP includes processors connected through dual local-area networks (not shown). If one processor of an SCP fails, another processor of the SCP can ensure that the SCP continues to function. Further, SCPs are configured as a mutually mated pair in different locations. If an SCP, such as SCP 10, is disabled, its mate, SCP 20, can ensure that telephone service continues without interruption.

Associated with each SCP 10, 20 is an SMS 60. An SMS 60 provides a support interface through which customer data and service logic can be added or managed.

The incorporated patent applications also disclose techniques for testing and validating CPRs that have been created at a creation environment. Testing of a CPR provides a visual indication on the displayed graphical representation (graph) of the CPR of the execution path taken through the CPR during a call processing operation. The visual indication is described in one embodiment as a red line trace of the paths connecting he nodes of a displayed graph.

Validating a CPR involves detecting logical infractions in the processing routine of the CPR and identifying these infractions to an operator based on a set of rules and a knowledge base understood by an expert system.

The creation and implementation of new telephone services today are complicated and time-consuming undertakings. Service applications are often highly complex software procedures that must be compiled and installed at the execution environment. Once a service application is installed at the execution environment, an operator has little ability to monitor and manage the service application from a remote creation environment.

DISCLOSURE OF THE INVENTION

Accordingly, it is desirable to provide a system and method for generating telephone services and for provisioning those services in an execution environment quickly and efficiently.

It is also desirable to provide a system and method for communicating CPRs, tables, and messages between a service creation environment and a service execution environment.

It is also desirable to provide a system and method that permits a telephone service creation environment to monitor, audit, and manage services that are executed in an execution environment.

It is further desirable to define an interface specification that permits a telephone service creation environment and execution environment to communicate at a high level.

It is further desirable to provide a service management system that offers a graphical user interface to activate, monitor, trace, audit, and manage services.

It is further desirable to define an interface specification which permits the effective and efficient communication of CPRs, tables, and messages between a service creation environment and a service execution environment.

To achieve the foregoing desires and objects, and in accordance with the purposes of the invention as embodied and broadly described herein, the present invention provides a system which can control a telephone switching network including a management processor having a graphics terminal, a control processor having a memory, a plurality of telephones each telephone having corresponding telephone numbers including a calling telephone number and at least one called telephone number, and a switching system coupled to the plurality of telephones, the method comprising the steps, executed by the management processor of displaying a plurality of graphs on the graphics terminal; encoding, in accordance with an interface specification, each of the plurality of graphs to generate a plurality of first memory structures; sending the plurality of first memory structures to the control processor, wherein the method further comprises the steps, executed by the control processor, of receiving the plurality of first memory structures sent in the sending step; decoding, in accordance with the interface specification, each of the plurality of first memory structures received in the receiving step to generate a plurality of the service procedures; storing the plurality of service procedures in the memory; detecting a telephone call; selecting one of service procedures stored in the memory according to one of the telephone numbers corresponding to the telephone call; and executing the selected service procedure to control the switching network.

BRIEF DESCRIPTION OF THE DRAWINGS

The accompanying drawings, which are incorporated in and constitute a part of the specification, illustrate presently preferred implementations of this invention and, together with the general description given above and the detailed description of the preferred implementations given below, serve to explain the principles of the invention.

In the drawings:

FIG. 5A illustrates Table Data in accordance with one embodiment of the present invention;

FIG. 5B illustrates a Table Specification in accordance with one embodiment of the present invention;

FIG. 5C illustrates a Table Record in accordance with one embodiment of the present invention.

BEST MODE FOR CARRYING OUT THE INVENTION

Reference will now be made in detail to the construction and operation of preferred implementations of the present invention which are illustrated in the accompanying drawings. In those drawings, like elements and operations are designated with the same reference numbers. The following description of the preferred implementations of the present invention is only exemplary of the invention. The present invention is not limited to these implementations, but may be realized by other implementations.

In a preferred embodiment of the present invention, service creation, service management, and service execution systems and methods are implemented in the AIN. In particular, CPRs and tables are created, validated, and tested in a SMS and then transmitted to an SCP where real-time call execution can take place in accordance with the service logic defined by the CPR. The Execution environment may also include other service logic execution environments such as Service nodes (not shown)

Figure 1:
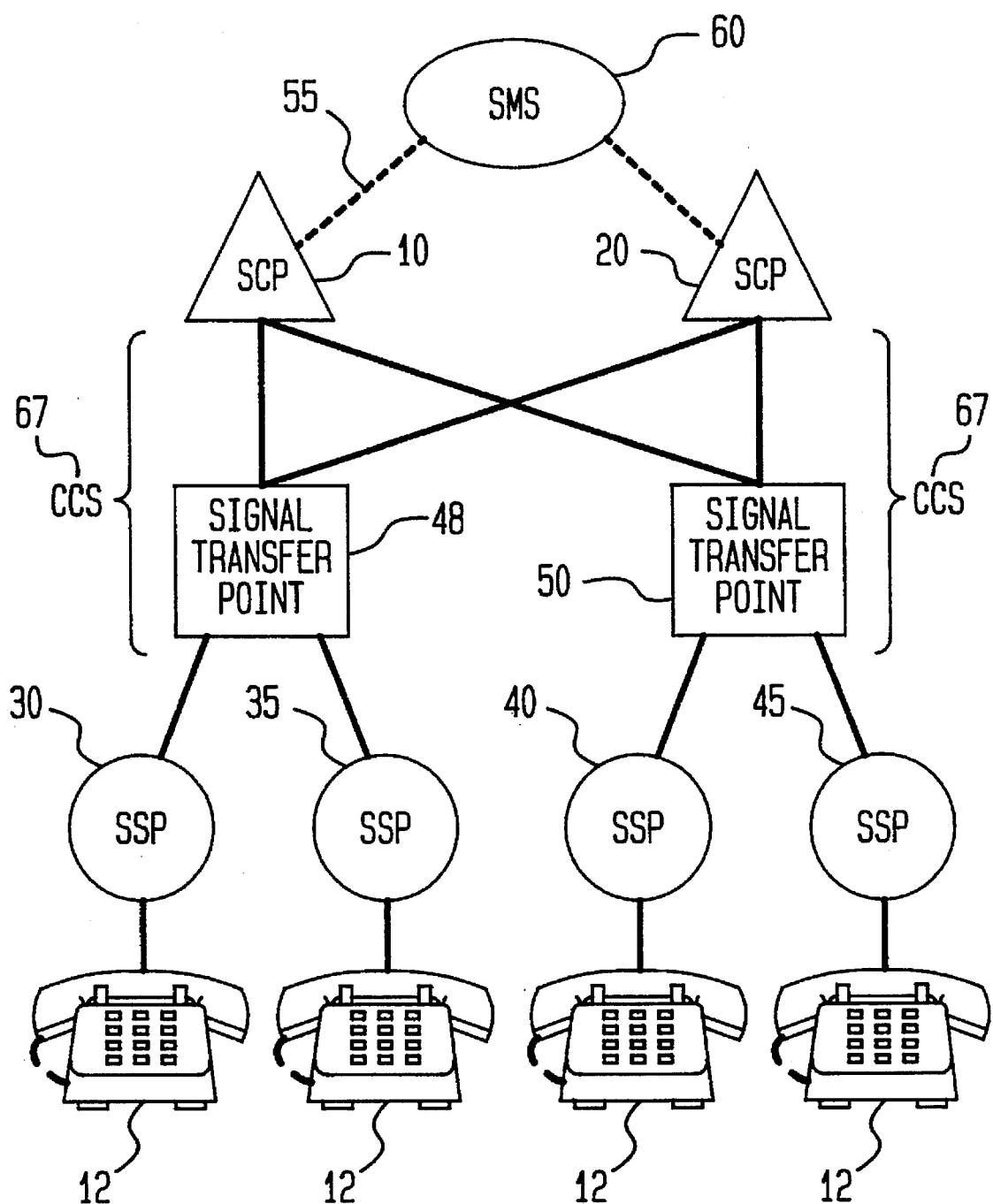
FIG. 1 is a block diagram of the Advanced Intelligent Telephone Network (AIN)

The various AIN system elements, such as the SMS 60 and SCPs 10 and 20 in FIG. 1 are typically manufactured by different vendors. Accordingly, certain open industry and international standards and protocols have been developed to satisfy users' increasing needs for communication and interoperability between the AIN system elements. In particular, the International Organization for Standards (ISO) and the International Telephone and Telegraph Consultative Committee (CCITT) have jointly developed the Open Systems Interconnection (OSI) standards for protocols for communication interfaces between ANI system elements. A description of the OSI reference model is provided below in Section L.

A. THE ABSTRACT SYNTAX NOTATION AND BASIC ENCODER RULE

The Abstract Syntax Notation (ASN.1) is the specification language of the presentation and application layers of the OSI reference model. In accordance with one embodiment of the present invention, the ASN.1 syntax is used to define the CPRs, tables, and messages transmitted between the SMS and the SCP.

ASN.1 is a formal descriptive language to describe data types/structures. It is used for specifying data units independent of their physical representation. ASN.1 provides a set of primitive data types, data structures, subtypes, and user defined types. It also offers macros, import and export facilities, value assignments, and various options. Since ASN.1 has no length specification, by default, all data types can be of indefinite length. To identify each data type uniquely, a tag (either a standard or user defined) is associated with each data type. Some OSI implementations provide an ASN.1 compiler to map the ASN.1 types to language specific structures. A description of some ASN.1 primitive data types is provided below in Section M.

The Basic Encoder Rule (BER) specifies the data transfer syntax, independent of machine architecture, for the ASN.1 data types. BER encodes each ASN.1 data type as tag, length, and value. BER can support arbitrarily complex ASN.1 structures and either a definite or an indefinite length specification. BER produces an octet-aligned encoding (the number of bits produced is a multiple of 8).

B. SYSTEM CONFIGURATION

Figure 2:
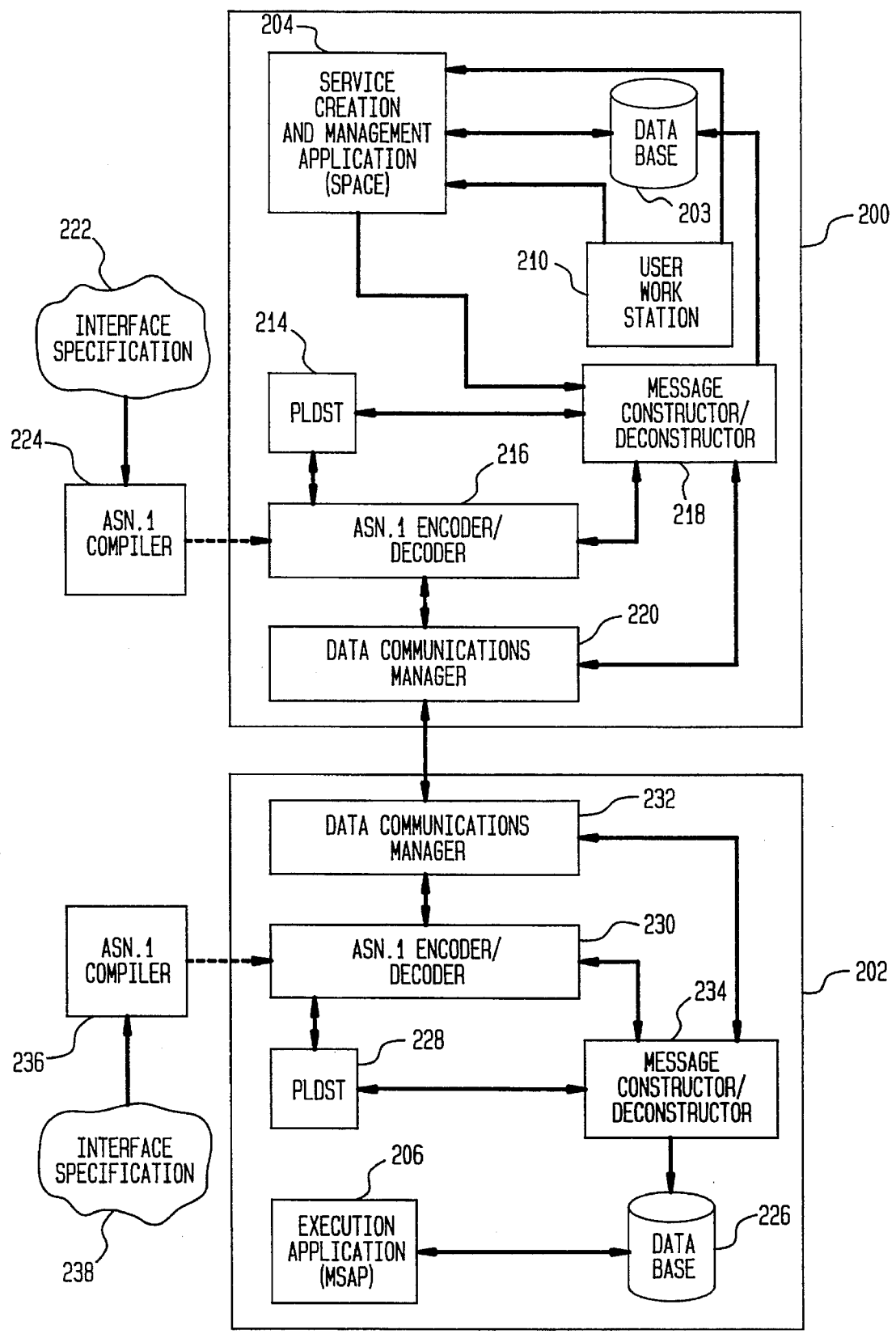
FIG. 2 is a block diagram illustrating a preferred embodiment of a service creation and management and a service execution environment.

FIG. 2 is a block diagram of a preferred embodiment of an SMS 200 and an SCP 202 in accordance with the present invention. The SMS 200 includes a service creation and management application 204 which preferably comprises the SPACE® application version 2.0. The SCP 202 includes an execution application 206 which preferably comprises the Multi-Services Application Platform (MSAP). Both SPACE® and MSAP are proprietary software applications owned by Bellcore, the assignee of this application. The service creation portion of SPACE is dedicated to the creation of CPRs, and the service management portion of SPACE is dedicated to managing services, testing and validating procedures, and transferring CPRs, tables, and messages to the SCP 202.

In addition to the service creation and management application 204, SMS 200 includes a user workstation 210, Programming Language Data Structure Translator (PLDST) 214, ASN.1 Encoder/Decoder 216, Message Constructor/Deconstructor (Message C/D) 218, and Data Communications Manager 220.

Figure 3:
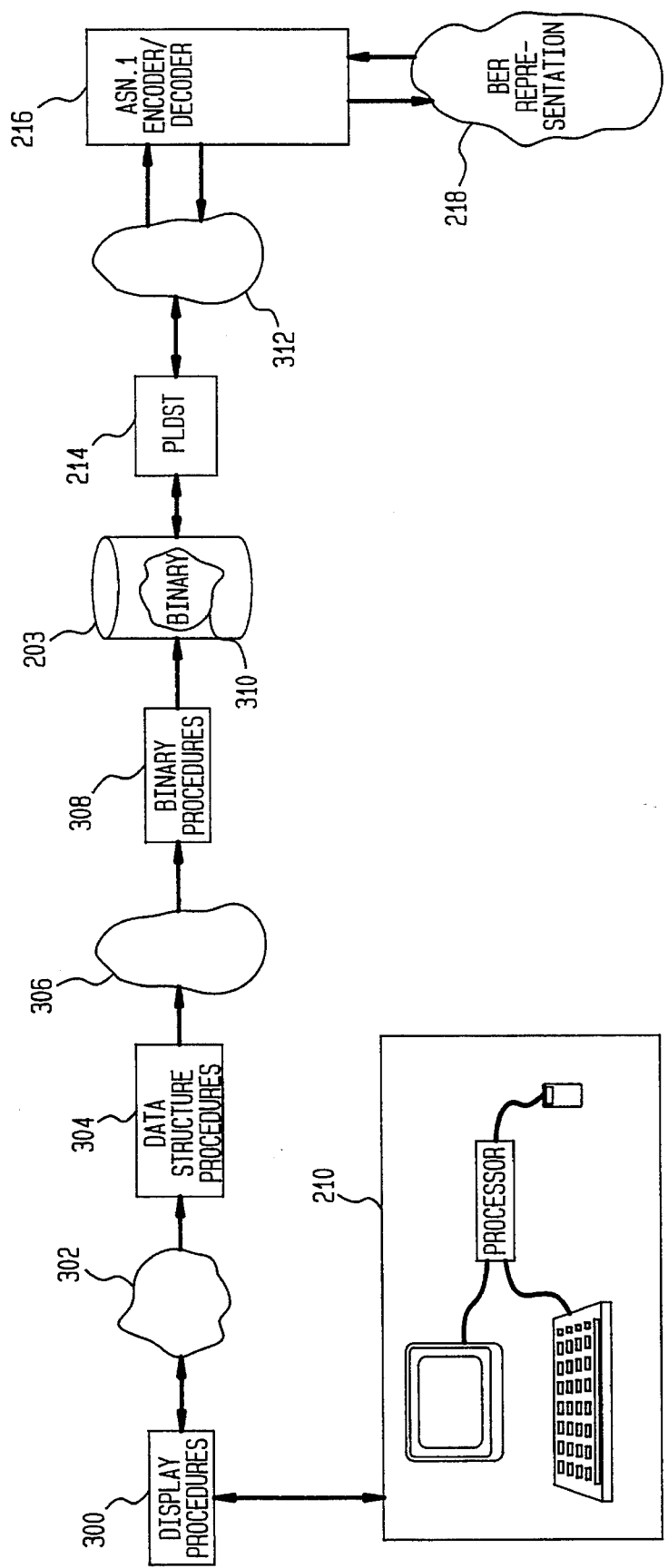
FIG. 3 is a data flow diagram for a service creation and management environment in accordance with one embodiment of the present invention.

As described above, CPRs are created using SPACE by generating a high level, displayed representation (graph) of the desired service on a display (not shown) of user workstation 210. The displayed graph of a CPR is extremely useful in that it permits an operator to create and understand the telephone service being created. However, the graph cannot be interpreted directly by an execution environment. Accordingly, in SPACE, the CPR graph is translated into a binary representation which can be used to process calls in the execution environment of the SCP 202. In a preferred implementation, however, the CPR graph is first translated into an internal representation comprising data structures and pointers representing the CPR. These translations and representations are shown in FIG. 3, wherein display procedures 300 of SPACE generate the display representation 302 of the CPR, data structure procedures 304 generate the internal representation 306, and binary procedures 308 generate the binary representation 310 of the CPR, which is stored in database 203. Preferably, the display procedures 300 are written in the C++ language, designed according to an object-oriented design methodology. Accordingly, the data structure procedures 304 are also object oriented. The data structure procedures 304 are less machine dependent than the display procedures 300 because the data structure procedures 304 can be used with many different display forms and many different types of hardware. The binary representation 310 of the CPR is the most machine independent.

As described above, the present invention provides for the communication of CPRs between the SMS 200 and the SCP 202 in accordance with the ASN.1 syntax; hence, SMS 200 includes ASN.1 Encoder/Decoder 216. However, ASN.1 Encoder/Decoder 216 does not encode the binary representation of a CPR. Instead, PLDST 214 is included in SMS 200 to translate the CPR binary representation 310 into a representation that can be encoded by the ASN.1 Encoder/Decoder 216. In particular, in a preferred embodiment, PLDST 214 translates the binary representation 310 into a C-language data structure representation 312. The data structure representation 312 is preferably different from the internal data structure representation 306 generated by data structure procedures 304 in that it is organized according to the Interface Specification 222. The Interface Specification 222 provides a high-level definition of CPRs, tables, messages in an efficient format to allow the creation, maintenance, and execution of CPRS. It contains the methods and procedures necessary to permit the SPACE application 204 to create the CPR and for the SPACE and MSAP applications, 204 and 206, respectively, to communicate sufficiently so that the MSAP application 206 can execute the CPR and the SPACE application 204 can monitor and maintain the CPR, even though the CPR is at the SCP 202.

The Interface Specification 222 is compiled by an ASN.1 compiler 224 to produce procedures for the ASN.1 Encoder/Decoder 216. The Interface Specification 222 is described below in more detail in Section I and in the Appendix.

The ASN.1 Encoder/Decoder 216 uses the data structure representation 312 output by the PLDST 214 to encode the CPR into BER format for transmission to the SCP 202. ASN.1 Encoder/Decoder 216 also encodes and decodes tables and messages to and from the BER format.

Data Communication Manager (DCM) 220 adds header information to an encoded CPR, table or message, performs handshaking operations between the SMS 200 and the SCP 202, and executes the transfer of the CPRs, tables or messages. DCMs and their operations are described in more detail below in Section J.

PLDST 214, ASN.1 Encoder/Decoder 216, and DCM 220 operate under the control of Message C/D 218 which, itself, is controlled by the SPACE application 204.

The following example illustrates the preferred operation of the SMS 200 in activating a CPR (i.e. transferring it to SCP 202) that has been created at the SMS 200. After an operator creates a CPR, the operator activates the CPR to transfer it to the SCP 202 where it can be used to provide the call processing procedures specified by the CPR. The operator activates a CPR by entering an activation code at user workstation 210. The SPACE application 204 responds to this activation code by calling Message C/D 218. Message C/D 218 retrieves the binary representation of the CPR to be activated and gives it to PLDST 214, which, as described above, translates the binary representation into a C-language data structure representation and passes it back to Message C/D 218. Message C/D then adds an appropriate message header (activation message) to the CPR record information. The activation message, as well as other messages, are described in detail below in Section I.4. Message C/D 218 then hands the C-language data structure representation and message header to the ASN.1 Encoder/Decoder 216 which encodes the data structure representation and message header into BER format and passes it back to message C/D 218.

Message C/D 218 then gives the BER format to DCM 220, which adds a header to envelope the CPR. However, since the DCM generates C-structure headers, these headers must also be encoded by ASN.1 Encoder/Decoder 216. Thus, DCM 220 passes the enveloped message back to ASN.1 Encoder/Decoder 216, which encodes the headers and passes the complete encoded CPR back to DCM 220. After performing the appropriate handshaking operations and establishing the desired link with the SCP 202, DCM 220 transfers the encoded CPR to the DCM 232 of the SCP 202.

In addition to the MSAP application, SCP 202 also includes a Database 226, a PLDST 228, an ASN.1 Encoder/Decoder 230, a DCM 232, and a message C/D 234. As with the SMS, the ASN.1 Encoder/Decoder 230 includes procedures generated by an ASN.1 Compiler 236 at the SCP 202 according to the Interface Specification 238, which is similar to Interface Specification 222.

At the SCP 202, the encoded CPR transmitted by the SMS 200 is received by DCM 232. The DCM 232, ASN.1 Encoder/Decoder 230, and PLDST 228 operate under the control of Message C/D 234 and the MSAP application 206 to decode the received BER format of the CPR into a C-language data structure representation and then into a binary representation for use in processing calls.

When a CPR is received by the DCM 232, the MSAP application 206 calls message C/D 234 which takes the BER format from the DCM 232 and hands it to the ASN.1 Encoder/Decoder 230. ASN.1 Encoder/Decoder 230 decodes the BER format into a C-language data representation, similar to data structure representation 312 at the SMS 200, and hands this C-language data representation back to message C/D 234. Message C/D 234 then passes the C-language data structure representation to PLDST 228, which translates this representation into a binary representation, similar to binary representation 218 in SMS 200, and passes it back to message C/D 234. Message C/D then stores the binary representation of the CPR into Database 226, where it can be accessed and executed by the MSAP application 206 during call processing operations.

Message C/D 234 also operates to control the retrieval and translation of CPRs and tables for transfer to the SMS 200 when instructed to do so by the SMS 200. The translation of a CPR from its binary representation stored in Database 226 to BER format by the SCP 202 is similar to the translation described for the SMS 200. Message C/D 234 further operates to generate messages (as described below) for communication with the SMS 200.

As described above, the Interface Specification 222 defines the structures of CPRs, tables, and messages to permit the efficient creation, maintenance, and execution of CPRs. Before describing the Interface Specification 222 in more detail, descriptions are provided of CPRs, tables, and information types used to define them. As indicated above, messages are described in detail in Section I.4.

C. CPR STRUCTURE

Figure 4:
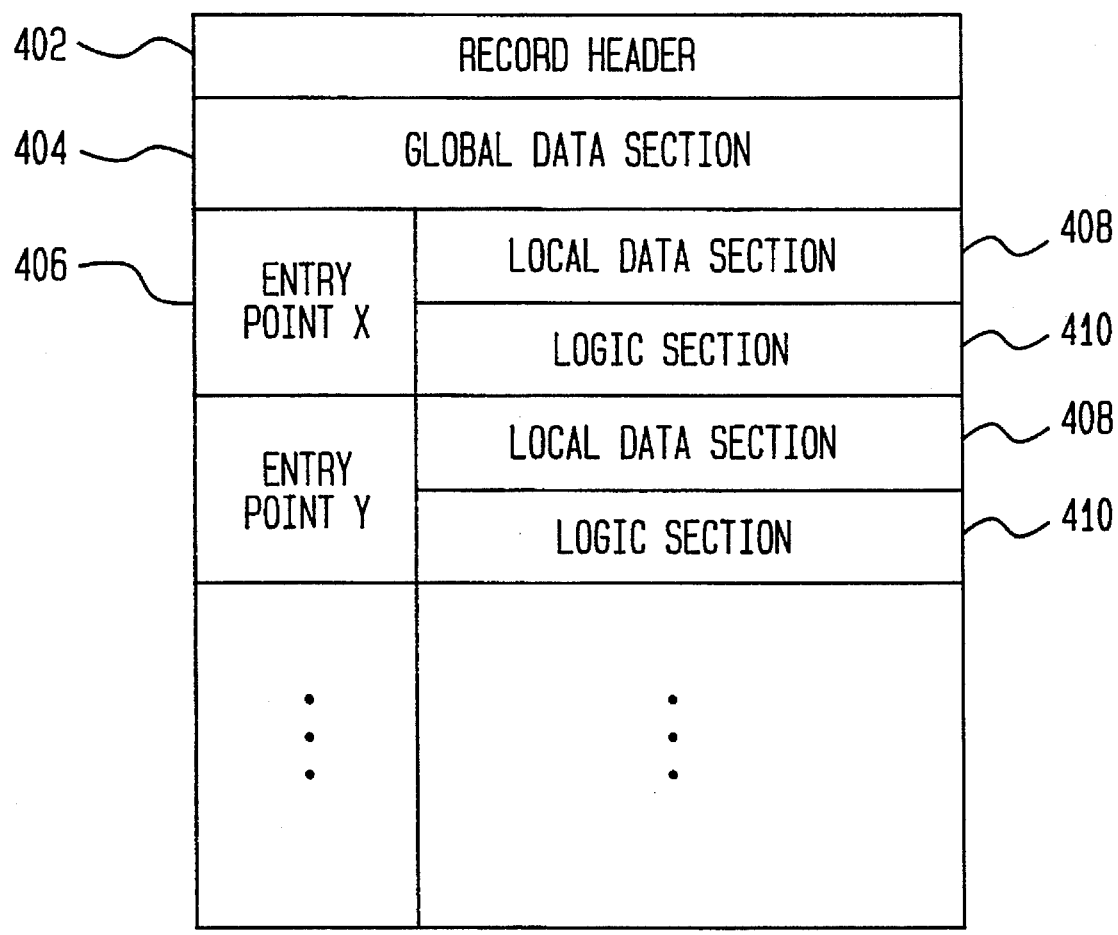
FIG. 4 is a diagram of a call processing record (CPR) in accordance with one embodiment of the present invention.

FIG. 4 illustrates a preferred structure or organization of a CPR. The CPR structure 400 includes a CPR Identifier or record header 402, a global data section 404, entry points 406, local data sections 408, and logic sections 410. The CPR Identifier includes information to match the CPR to one or more customers. For example, in one embodiment of the invention, the CPR Identifier or record header 402 may correspond to the telephone number of a customer. The CPR Identifier 402 also includes data that characterizes the CPR. For example, the CPR Identifier 402 may contain a code indicating whether the CPR is "shared"or non-shared.

Shared CPRs are used in performing services for multiple subscribers while non-shared CPRs are only used for one particular subscriber service. Designation of whether a CPR is shared or not is made by the service designer in SPACE. Whether a CPR is shared or non-shared does not change its structure. However, shared CPRs are labeled to give the SCP the capability to improve performance by storing them in a manner that provides faster access time.

The Global Data Section 404 consists includes global data used by the logic of all entry points within the CPR. This global data may include, for example, declarations and/or definitions of call variables (described in Section E below), tables, and measurement vectors. In addition, global data that is used by other CPRs may be defined in this section.

Entry Points 406 are known externally to the CPR. A user may assign any name to an entry point. Two entry point names have special significance in the execution environment: (1) "dln" which is called to process an originating number query; and (2) "ani" which is called to process a called number query.

Each Entry Point is associated with an optional Local Data Section 408 and a required logic section 410. The Local Data Section 408 includes the local data used only by the logic of the associated Entry Point. This local data consists of definitions of call variables of local scope. Each Logic Section 510 contains the actual call processing logic corresponding to a particular graph or service.

When a SCP 202 processes a CPR, after having retrieved it based on the CPR Identifier 402, it first reads the global data section 404 and applies all call variable definitions therein.

As an Entry Point is interpreted, the CPR reads the local data from Local Data Section 408 associated with the Entry Point 406. The call processing logic of the associated Logic Section 510 is then interpreted using the local data.

D. TABLES

In accordance with the present invention, tables may be used to store lists of values used in processing one or more CPRs. Tables (also referred to herein as valuelists) can be created as stand-alone records, or can be embedded within CPRs. Stand-alone tables are identified by a key selected by an operator, similar to that of a CPR. Embedded tables are identified using a "Table" call variable. Tables are defined by a Table Specification and Table Data. The Table Data is laid out in one or more rows corresponding to predefined columns. The Table Specification defines these columns and other attributes of the Table. FIGS. 5A and 5B illustrate the Table Data and Table Specification for a Table that associates telephone extensions of an office building with any selected telephone having a maximum length less than 15 digits.

The Table Data in FIG. 5A includes two columns: one column 500 listing the number of extensions in the office building; and the second column 502 listing the telephone numbers associated with each of the three exemplary extensions.

FIG. 5B illustrates the Table Specification for the Table Data shown in FIG. 5A. The Table Specification includes four rows: name, data type, maximum length, and key. The information defined by these four rows is specified for each of the columns of Table Data. Thus, as shown in FIG. 5B, the name of the first column is "EXTENSION," and the name of the second column is "TELEPHONE NUMBER." The Data Type of the EXTENSION column is a numeric string, and the Data Type of the TELEPHONE NUMBER column is a telephone Data Type. The maximum length of the numeric string in the EXTENSION column is four digits, and the maximum length of the TELEPHONE NUMBER in the telephone column is 15 digits. The Key Specification permits a user to specify whether the column can be searched. As shown in FIG. 5B, the data in the EXTENSION column can be searched while that in the TELEPHONE NUMBER column cannot be searched.

FIG. 5C illustrates a Table Record Structure for a standalone Table. As shown, the structure includes a Header Section 516, the Table Specification 506 shown in FIG. 5B, and the Table Data 500 as shown in FIG. 5A. For embedded tables, the Table Specification 506 and Table Data 500 are stored as part of the call variable that denotes the embedded table.

In one embodiment, five operations can be performed on Table Data. The addRow operation adds (or inserts) a set of rows into a table. The delRow operation deletes a set of rows in a table. The updtRow operation updates a set of values in a table. The findrow operation searches a table for a specified row. The selRow operation selects a set of columns from a table that match a specified condition. The nextRow operation selects a set of column values from the next row of a table that match the specified condition in the previous selRow operation.

E. CALL VARIABLES

Call variables (CVs) identify data elements whose values are processed by CPRs. Before a call variable can be used, it must be defined. To define a call variable, the following attributes are preferably specified: Tag Name, Scope, Data Type, and Optional Initial Value.

The tag name is a name which identifies the CV. For example, MTOD is the tag name for time of day CV, MDOW is the tag name for the day of week CV, and QDIALEDNBR is the tag name that refers to the dialed number CV. Scope determines the visibility and the extent of the CV; e.g. global or local and persistent or non-persistent. Data Type refers to the type of data stored in the CV, which can be, for example, a string or an integer. An Optional Initial Value can be any valid value of the Data Type indicated for the CV.

Pre-defined CVs are those CVs whose Tag Name, Scope, and Data Type are defined in the Interface Specification 222. Pre-defined CVs get their initial value from one of the following sources: TCAP input message, the system environment, or the context of a test call. CVs that do not have an initial value are initialized to a default value of Null. Hence, tests on a CV should also include the possibility of the value being NULL. An example of a CV with such a need would be the originating station directory number which may or may not be included in a TCAP query. When it is not present in the TCAP query, its value is initialized to NULL.

Call processing routines may use values which are in the TCAP input message to initialize the pre-defined CVs. They may also use the CVs to set values on the TCAP output message. The TCAP CVs have a global call scope.

CVs such as TOD and DOW are available in the system environment or from a simulator test query. The system environment variables can be regarded as read only since they can only be referenced and cannot be modified. However, a copy of these variables is made within the transaction context when a call is initialized by MSAP. The copied variables are pre-defined to have global call scope.

User-Defined CVs can be defined for specific services being created. An example of a user-defined CV is the counter used to count the number of times a loop has been executed; such as the number of retries.

F. DATA TYPES

The following data types are preferably used to specify CPRs, tables, and messages.

1. Signed Integer—This data type is a positive or negative number or zero.
2. Bit String—This data type is a String of 1 or 0 bits that represent logical values. To be recognized, the bit string preferably begins with the letter "B."
3. Telephone Number—The telephone number data type represents values of telephone numbers. To be recognized, the telephone number preferably begins with a letter from the set T, S, I, and P, where, T=National Telephone numbering plan, I=International Number, S=Special Number, and P=Private Number.
4. String—This data type is a string of characters.
5. Date—This data type represents a date.
6. Day of Week (DOW)—This data type is used to represent the days of the week.
7. Time of Day (TOD)—This data type is used for the representation of the time of day.
8. Carrier—The Carrier data type is used to represent an Inter or Intra-LATA Telephone Carrier Company Designation. For example, LEC, ATX, or 22. Also, these carrier strings can be represented by a three digit number. If so, the carrier integer representation can be prepended with the letter "C" to identify it as a carrier value.
9. Boolean (also y/n for yes/no)—This data type is used to represent one of only two possible values: true/false or yes/no.
10. Float—This data type is used to represent a floating point number. The precision is determined by storage restrictions.
11. Table—This data type is used for the representation of tables embedded in a CPR.
12. Measurement Vector—This data type is used for the representation of a vector of counts.

G. EXPRESSIONS

An expression is a construct that has a value when evaluated. The value that is returned preferably has a data type. The expression is the basic unit of data manipulation. For example, an assignment node (described below in more detail) consists of a left-hand part (preferably a call variable expression), an assignment operator, and a right-hand side which is an expression. Expressions can be constants, call variables, or manipulators.

H. MANIPULATORS

Manipulator functions consist of an operation that is performed on one or more other expressions. These expressions can be a call variable, a constant, or the return value of another manipulator function. Each argument of a manipulator function is preferably an expression of a type that makes sense unless extended to special cases. Manipulators include arithmetic manipulators for performing addition, subtraction, multiplication, and division functions; logical manipulators for performing boolean functions; and comparison manipulators for performing comparison functions on two expressions (i.e. =, =, >, <, $\geq$, and $\leq$). Other manipulator functions preferably include the following:

1. inc(x)—This function adds one to a value.
2. dec(x)—This function substracts one from a value.
3. sqr(x)—This function returns the square of x.
4. sqrt(x)—This function returns the square root of x.
5. abs(x)—This function takes the absolute value of a value.
6. strlen (arg)—This function determines the length of the given argument.
7. substr (arg1, start, len)—This function returns part of an arg1.
8. testbit (b itstr1, y)—This function tests a bit in a bitstring.
9. clrbit (bitstr1, y)—This function clears a bit in a bitstring.
10. setbit (bitstr1, y)—This function sets a bit in a bitstring.
11. laststring (arg1, n)—This function returns the last n characters of a string or telephone number.
12. concat (arg1, arg2)—This function returns the result of the concatenation of the input arguments.
13. telcomp (tel, component)—This function returns component(s) of a telephone number.
14. doyComponent (date1, component)—This function returns day of year components.
15. concatenate (str1, str2)—This function concatenates two data strings.
16. telephonestr (arg1, plantId, NON)—This function converts a numeric string into a telephone number.

I. INTERFACE SPECIFICATION

As described above, the Interface Specification 222 provides a high-level definition of CPRs, tables, and messages and contains the methods and procedures necessary to permit the SPACE application 204 and the MSAP application 206 to communicate effectively to allow creation, maintenance, and execution of CPRs. Specific specifications exist for CPRS, the nodes that comprise them, tables, and messages. A description of each of these specifications follows.

1. CPR Specification.

In accordance with one embodiment of the present invention, a CPR may be characterized by the following specification to comport with the ASN.1 syntax.

```
CprRecordInfo::=CHOICE {
    shcpRecordBody [0] CprRecordBody, -- shared
cpr
    nshcprRecordBody [1] CprRecordBody, -- non-shared cpr
    dtmfcprRecordBody [2] CprRecordBody, -- dtmf cpr
```

A CPR record can be categroized into 3 types, shared cpr, non-shared cpr, or DTMF cpr. The CprRecordBody specification is shown at paragraph 20 of appendix A. As shown thereat, the CprRecordBody specification consists of at least the following fields:

1. testFlag—The flag in this field is set if the CPR is used to test the call processing operations.
2. expirationTime—This field identifies the absolute expiration time for trace in seconds. If the current time is greater than the expiration time, then no trace data is collected.
3. dtmfTimeStamp—This field contains the time of last DTMF update; 0 is no previous DTMF update. These fields are included in the CPR header 402.
4. cprDataPart—This field identifies the global data portion of the CPR. It consists of the declaration (or definition) and an initial value of each of the global call variables used in the CPR. This field corresponds to the CPR global data section 404.
5. entryPoints. Each entry point consists of the following fields:
   (a) entryPtKey—This field includes the names at the entry point.
   (b) localDataPart—This field contains the local data-part of the CPR entry point. This is a repeating data structure, which consists of a declaration (or definition) and an initial value for each of the local call variables used in the entry point.
   (c) epLogicPart—This field includes the logic part of the CPR which consists of a sequence of nodes.
   (d) epEchoField—This field includes a block of binary data for the entry point. These entry point field correspond to the CPR entry points 406.
6. cprEchoField—This field includes a block of binary data for the CPR.

The cprDataPart specification is shown at paragraph 18 of Appendix A. As shown thereat, cprDataPart contains the definition of a call variable, embedded valuelist, or a measurement vector.

The call variable structure is shown at paragraph 23 of Appendix A. As shown thereat, cvDataPart contains the definition/declaration of a local or a global call variable. It includes the name of the call variable, datatype, maximum field length, scope of the variable, and the initial value for the variable. The initial value for the call variable can be defined by a simple expression or can be imported from another call variable. Importing a call variable is similar to defining an alias for the call variable. The entry point in the CPR from which the call variable is being imported must contain the definition of the call variable being imported.

The embedded valuelist of the cprDataPart specification contains the definition/declaration of an embedded valuelist. It contains the name, maximum number of rows allowed, scope, initial value, and the definition of the columns in the valuelist. The initial value is a set of ExplicitValues. The number of values in this set must equal n*m where n is the number of rows in the valuelist and m is the number of columns in the valuelist. ColumnDescriptor contains the name of the column in the valuelist, the datatype of the column, the maximum length of the column, and a flag indicating whether the column is a key column.

The measurement vector of the CPR Data Part Specification is defined by the MvDefinition in paragraph 44 of Appendix A. It contains the name of the measurement vector, the components in the vector, and the measurement interval.

2. Node Specification

As described above, the incorporated patents disclose that a CPR is created using "nodes," which represent instructions for the execution of a service. The Node specifications used in the CprRecordNode will now be described.

In one embodiment of the present invention, a preferred set of nodes for creating CPRs are classified into three types, Action nodes, Decision nodes, and Administrative nodes.

Action Nodes includes Assignment nodes, Handover Nodes, Transfer Control Nodes, Connect Nodes, Terminate Nodes, Play Announcement and Collect Digits Nodes, and Load Call Variable Nodes.

Decision Nodes include Call Variable Decision nodes, Percent Decision Nodes, and Comparison Nodes.

Administrative Nodes include Sampling nodes and Measurement nodes.

In a preferred embodiment of the present invention, the Interface specification for nodes in general is as follows:

```
Node::=SEQUENCE
    nodeSpecId INTEGER, -- used by SPACE.
    node ID INTEGER, -- number in the range 0-
32767
    -- childnode can be a leafnode (-1), or undefined
        child (-2) if the child node
    -- is undefined; otherwise should be a valid
        child node id in the range 0 to 32767.
    childNode INTEGER {leafnode(-1), undefinedchild(-
2) },
    simpleNode CHOICE {
        assignmentNode        [0] AssignmentNode,
        connectNode           [2] ConnectNode,
        terminateNode         [3] TerminateNode,
        planAnncAndCdNode     [4] PlayAnncAndCdNode,
        cvDecisionNode        [5] CvDecisionNode,
        percentDecisionNode   [6] PercentDecisionNode,
        comparisonNode        [7] ComparisonNode,
        handoverNode          [8] HandoverNode,
        transferCntlNode      [9] TransferCntlNode,
        samplingNode          [10] SamplingNode,
        measurementNode       [11] MeasurementNode,
        loadCvNode            [12] LoadCvNode -- for
                                   dynamically importing
                                   cv,
        genericAction Node    [13] Generic Action Node
    }
}
```

As shown above, the node specification consists of five fields. The nodeSpecId field provides an identification for the node specification information. The nodeId field provides a unique identification for the node (within the logic-part of the entry-point). The childNode field provides the nodeId of the child node. The simpleNode field is one of the allowed nodes.

The Interface Specification for each of the preferred nodes identified above will now be described.

ASSIGNMENT Node.—The formal specification for the ASSIGNMENT node is shown in paragraph 8 in Appendix A.

The ASSIGNMENT node consists of the output call variable (outputCv) and an input expression. The expression in the above specification can either be a simple expression or a valuelist expression. The simple expression is provided at paragraph 55 of Appendix A. A simple expression can be either a constant of one of the data types, a call variable name, or the output of a manipulator. The valuelist expression (VlExpression) used in the expression structure is shown at paragraph 70 in Appendix A. The valuelist consists of one of the valuelist manipulators, including searchVlRow, selectVlRow, SelectNextVlRow, addVlRow, and deleteVlRow.

The searchVlRow operation is used to test if a particular row (specified by the whereQual field) is in the valuelist table identified by the valuelistName field. The return value of this expression is of boolean type; FALSE if the row is not found, TRUE, if the row is found.

The selectVlRow operation is used to obtain one or more column values in a particular row (specified by the whereQual field) from the valuelist table identified by the valuelistName field. The sourceAndTarget structure defines the output call variable(s) and the corresponding column(s) in the valuelist. If the specified row is found, then the specified column values are assigned to the corresponding call variables. The return value of this expression is a boolean type; FALSE if the row is not found, TRUE, if the row is found.

The selectNextVlRow operation is used to obtain one or more column values in the subsequent rows that satisfy the "where" condition specified in the previous selectVlRow operation for the same valuelist.

The addV1Row operation is used to add a new row to the valuelist. The rowvalues field must contain values for each column in the valuelist (in the order specified in the definition of the valuelist). The operation returns a boolean value; TRUE, if successful, FALSE, otherwise.

The updateVlRow operation is used to update the value of a column in a valuelist. The row to be updated is identified by the specification in the field whereQual. Note that the field, whereQual, must be specified. The new columnValue cannot be NULL. The operation returns a boolean value; TRUE, if successful, FALSE, otherwise.

The deleteVlRow operation is used to delete a row in a valuelist. The row to be deleted is identified by the specification in the field whereQual. Note that the field, whereQual, must be specified. The operation returns a boolean value; TRUE, if successful, FALSE, otherwise.

The specification of the WhereQual structure used in the valuelist expressions is provided at paragraph 72 of Appendix A.

HANDOVER Node. The HANDOVER Node is used to pass control from a current CPR entry point to another CPR entry point in the same or different CPR. When processing of the called entry point is complete, the control is returned back to the point where handover took place. Two data elements are required for a Handover Node: a CPR record key and an entry point key. The handover CPR key or entry point key can be specified using a call variable name. The specification of the HANDOVER node is provided at paragraph 40 of Appendix A.

TRANSFER CONTROL Node. The TRANSFER CONTROL Node is similar to the HANDOVER Node except that the control is not returned back to the calling CPR. If a Transfer Control node is encountered in a handover graph, the nodes following the HANDOVER node in the first CPR will not be traversed. The specification of the TRANSFER CONTROL node is provided at paragraph 62 of Appendix A.

CONNECT Node. The CONNECT Node is used to route a call from the SSP to the network. The telephone expression specified in the node is assigned to the predefined call variable, RROUTNBR. The specification of the CONNECT node is provided at paragraph 17 of Appendix A.

PLAY ANNOUNCEMENT and COLLECT DIGITS Node. The PLAY ANNOUNCEMENT and COLLECT DIGITS Node is used to play an announcement to the caller and collect digits from the caller. Two data elements are required for the Play Announcement Node: the announcement number and the number of digits to collect. The specification of this node is provided at paragraph 47 of Appendix A. When the node is parsed, the values of the anncNumber and numberOfDigits fields are assigned to the predefined call variables CANNC1 and CNBRDIGITS1, respectively. When the conversation response is received from an SSP, the collected digits are assigned to the predefined call variable, cdialednbr.

TERMINATE Node. The TERMINATE Node is used to block routing of a call. A terminating announcement code is identified in this node. The specification of the TERMINATE node is provided at paragraph 60 of Appendix A.

LOAD CALL VARIABLE Node. The Load Call Variable Node is used to import a variable from another CPR. Importing a call variable is similar to defining an alias for the call variable. The entry point in the CPR from which the call variable is being imported contains the definition of the variable being imported. If the specified CPR or the call variable does not exist, then the predefined call variable MERROR is set to TRUE; otherwise, it is set to zero. The specification of the LOAD CALL VARIABLE node is provided at paragraph 42 of Appendix A.

PERCENT DECISION Node. The PERCENT DECISION Node is used to branch to different node addresses, based on prespecified percentages. The operation of this node is based on a uniform random number generator, and the frequency with which each branch is selected is equal to the percentage associated with the branch.

The specification of the PERCENT DECISION node is provided at paragraph 46 of Appendix A. As shown thereat, this node consists of a list of decision branches. Each branch consists of two data elements, child node and the percentage value associated with the branch.

Rather than using the random number, the percentage value can be specified by one of the five pre-defined call variables, MPERCENT1, MPERCENT2, . . . MPERCENT5. In processing a call, when the first percent decision node is encountered, if MPERCENT1 is defined, then its value is used to decide which of the child branches to take; otherwise, a random number is used to make the decision. Similarly, when the second percent decision node is encountered for the same call, if MPERCENT2 is defined, then its value is used to decide on the branch; otherwise, a new random number is used to make the decision.

CALL VARIABLE DECISION Node. The specification of the CALL VARIABLE DECISION node is provided at paragraph 12 of Appendix A.

This Node is used to branch to different node addresses, based on three types of comparisons. The first comparison is a test for NULL. In this case, the specified branch is taken if the call variable (input Cv) is NULL. The second comparison is for an exact match. In this case, the specified branch is taken if inputCv matches inputArgs[0]. The third comparison is for a range match. In this case, if inputArgs[0]$\leq$inputArgs[1], then the specified branch is taken if inputCV satisfies the condition: inputArgs[0]$\leq$inputCv$\leq$inputArgs[1]. If inputArgs[01]$\leq$inputArgs[1], then the specified branch is taken if inputCv satisfies the following conditions: inputArgs[0]$\leq$inputCv or inputCv$\leq$inputArgs[1].

By defining the input call variable using the expression structure, a manipulator function can be explicitly applied to the call variable before making the branch decision.

COMPARISON Node. The COMPARISON Node is used to branch to different node addresses based on a specified comparison. The specification of the COMPARISON node is provided at paragraph 16 of Appendix A.

SAMPLING Node. The SAMPLING Node allows. collection of service or subscriber traffic data which is used in analyzing service usage. The SAMPLING Node requires a sampling rate, a sampling type, a sample data name, an optional retention period, and a list of CVs to be collected. The specification of the SAMPLING node is provided at paragraph 49 of Appendix A.

MEASUREMENT Node. The MEASUREMENT node is used to update a component of a measurement vector. The specification of the MEASUREMENT node is provided at paragraph 43 of Appendix A. As shown, as explicit value can be assigned to a component of the measurement vector or the existing value of the component can be incremented or decremented by 1.

GENERIC NETWORK ACTION Node. This node specifies action to be taken and assigns values to call variables required for action. The specification for the GENERIC NETWORK ACTION node is provided at paragraph 38 of Appendix A.

3. Table Specification

The specification for the valuelist record is provided at paragraph 66 of Appendix A.

The useFlag field in the above specification will guide MSAP to save the valuelist in shared memory or in disk. For the frequently used valuelists, this flag should be set to savinsharememory. The remaining information for a valuelist record includes the column names, datatypes, max lengths, and key, as described in connection with FIG. 5B in Section D above.

4. Message Specification

Messages exchanged between an SCP 202 and an SMS 200 are preferably either commands, responses, or unsolicited messages between the SPACE 204 and MSAP 206 applications. These messages allow the SMS 200 to maintain and monitor CPR that are transferred to and executed at the SCP 202.

As described above, each message consists of a communication header and a data portion. The header includes a version, priority, message identification, message destination identification, message source identification, message origination identification, error code, and message code.

Messages between the SMS 200 and SCP 202 are defined by the following Specification comporting with the ASN.1 syntax:

```
SDIPDU ::= SEQUENCE {
    globalTransactionId OCTET STRING --CMAP char[20],
    currentTimeStamp INTEGER, -- effective date
    message CHOICE {
    -- SMS initiated Messages
    activationMessage       [1000] ActivationMessage,
    auditMessage            [1001] AuditMessage,
    setTraceMessage         [1002] SetTraceMessage,
    activateSSMessage       [1003] ActivateSSMessage,
    -- Response to SMS initiated messages
    activationResponse      [1100] ActivationResponse,
    auditResponse           [1101] AuditResponse,
    setTraceResponse        [1102] SetTraceResponse,
    activateSSResponse      [1103] ActivateSSResponse,
    -- Unsolicitated messages
    traceData               [1200] TraceData,
    dtmfMessage             [1201] DtmfMessage,
    exceptionMessage        [1202] ExceptionMessage
    endSSMessage            [1203] EndSSMessage,
    }
}
```

The "globalTransactionId" field correlates the requests and the responses. The SMS 200 generates a character string and places the character string in the globalTransactionId field. The SCP 202 sends the response back to the SMS 200 with the same globalTransactionId. If a request message is retransmitted because the response fails to come back within a given time period, the same globalTransactionId is used during the retransmission.

The "currentTimeStamp" field represents the activation time of a CPR or valuelist, the time when a request is made (for example, in the Set Trace Message), or the time when an event happens (for example, in the Exception Message).

a. Specific messaged

Activation Messages. The SPACE application 204 preferably packages all customer-specific call processing data in CPRs and Valuelists (tables). Changes to the CPRs and valuelists are propagated from the SPACE application to the MSAP application using the Activation messages. These operations include:

1. addrec (record addition). This operation adds a single CPR or an entire valuelist record from the SCP database;
2. deleterec (record deletion). This operation deletes a single CPR or an entire valuelist record from the SCP database;
3. updaterec (record update). This operation updates an existing CPR or an entire valuelist record (a negative response is returned from MSAP if the record does not exist in the MSAP database);
4. replacerec (record update). This operation replaces a single CPR or an entire valuelist record if it already exists, or add a record if it does not exist in the SCP database; and
5. inclupdate (incremental valuelist update). This operation adds, deletes, replaces, or updates a set of rows in an existing valuelist.

The specification of the Activation message is provided at paragraph 4 of Appendix A.

Audit Messages. These messages are used to audit the SCP database records. The specification of the Audit message is provided at paragraph 10 of Appendix A.

As shown, three levels of audit functions can be provided. The first level retrieves a list of all record keys from the SCP Database 226. This is used to find out about any CPR in the SCP 202 that does not exist in the SMS 200. The second level retrieves a list of all CPR keys with the corresponding effective time and the service activated update time for each CPR from the SCP Database 226. In this case, the keyList field contains a list of record keys for which the information is to be retrieved. The third level is to retrieve the complete CPRs for the specified keys from the SCP Database 226. In this case, the keyList field contains a list of record keys for which the information is to be retrieved.

Set Trace Message. This message is used to enable generation of call trace data for a specific CPR. This is done by updating the trace expiration time field in the CPR. Trace data will be collected for a call if the trace expiration time of the main CPR is later than the system time when a call is processed at the SCP 202. The trace data will be sent to the SMS 200 when a call is completed. The specification of the Set Trace message is provided at paragraph 53 of Appendix A.

Activate Special Study Message. This message is used to activate a new special study or change an active special study. The specification of the Activate Special Study message is provided at paragraph 2 of Appendix A.

As shown thereat, the Activate Special Study message consists of four fields. The Operation (recOp) field adds a special study or deletes an existing study. The ssId field is a unique identifier. The trapField field is one of a set of the specified call variables. This can be an exact match if noSelection is specified in the fieldSelection field, or match to a component or a substring if telComponent or substring is specified in the fieldSelection field. Extra special studies details are generated if one of the call variables is a telephone number. The trapType field contains either a limit on the number of calls or a time limit.

Activation Message Response. This message is a response to the Activation Message initiated by the SPACE application 204 at the SMS 200. The specification of this message is provided at paragraph 5 of Appendix A.

If all the changes in the request message have been applied to the SCP Database 226 successfully, the SCP 202 will return a positive response. The SCP 202 will return a negative response message if it fails to apply changes to any record in the request message. All the changes in the same request message that have been applied will be rollbacked.

Audit Response. This message is a response to the Audit Message initiated by the SPACE application 204 at the SMS 200. The specification for this message is provided at paragraph 11 of Appendix A.

The Audit response contains the CprRecord and the ValuelistRecord structures when the auditType is fullrecord. When the auditType is effectivedate, a response contains the KeyListResponse structure, the specification of which is provided at paragraph 41 of Appendix A.

Trace Data Message. This message is used to return the trace data used for remote red-line tracing. This message is generated for every CPR for which the trace flag is set. The Trace Data message is provided at paragraph 61 of Appendix A. If an error was encountered while parsing the CPR, the error code and the corresponding parameters are returned in the fields err and errMsgParameters, respectively.

For each CPR entry point encountered, the list of nodes visited and the local call variable values are returned in the nodesVisited structure. The localCvData structure will also contain the embedded valuelists and the measurement vectors used in the call. The global call variable values at the end of the call are returned in the globalCvData structure.

DTMF Update Message. This message is used to notify the SMS 200 of a service activated update to a CPR or a valuelist. The DTMF update message specification is provided at paragraph 31 of Appendix A.

As shown, a DTMF update message consists of a CPR key or valuelist name (identified by the RecordId structure), call variable or valuelist column identification, and the time the DTMF request was processed by the SCP.

The CV or Valuelist column identification consists of the call variable name for a CPR change, the valuelist column name to be changed, and the keyvalues identifying the row of the valuelist (identified by the ValuelistColId structure), for a valuelist change, and old and new values of the variable. Multiple DTMF changes to the same CPR/valuelist can be packaged into one DTMF message, in which case all the changes in a message are considered to be one transaction, that is either they are all applied or they are not applied at all. The response to a DTMF message is normally an activation message to replace the corresponding CPR or valuelist.

Exception messages. These messages are used to identify problems encountered during call processing. The specification for the Exception message is provided at paragraph 34 of Appendix A.

End Special Study Message. This message is used to notify the end of a special study (i.e., the specified trap limit or the time limit for the study has been reached). The specification for the End Special Study message is provided at paragraph 32 of Appendix A.

5. Example

The following example illustrates an ASN.1 pseudo code specification for a predetermined CPR graph.

Figure 6:
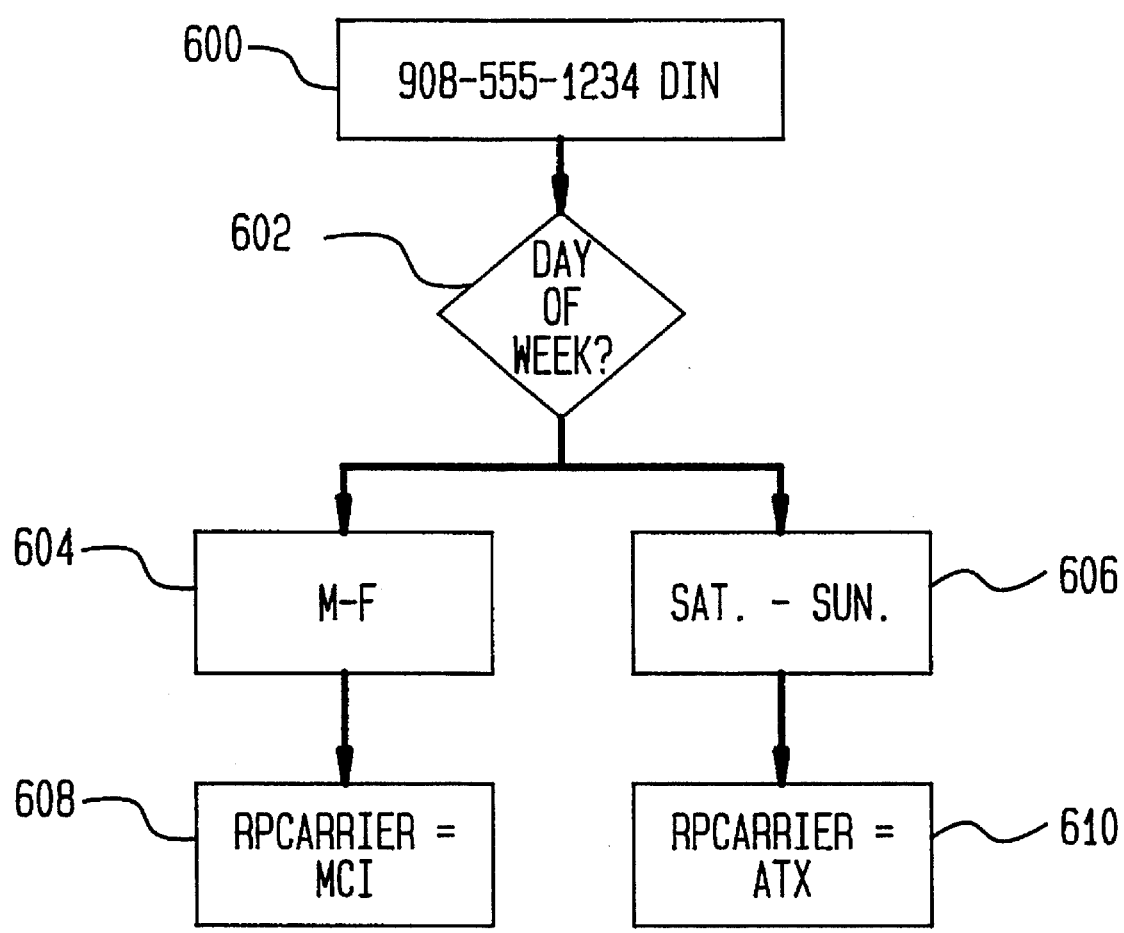
FIG. 6 illustrates a graph of a service in accordance with one embodiment of the invention.

FIG. 6 shows a graph of a telephone service for telephone calls made from the telephone number (908) 555-1234. This service selects the carrier MCI on weekdays, Monday–Friday and selects the carrier ATX on weekends, Saturday–Sunday. Key node 600 specifies that the service is to be executed when a phone call is made from the telephone number (908) 555-1234. Node 602 is a Day of Week node which has a predefined call variable having a value from 1–7 representing one of the days of the week. If the Day of Week node determines that the call is being placed during Monday–Friday, as represented by branch 604, the call is routed by Carrier node 608 which has an assigned value of MCI. Otherwise, as represented by branch 606, the call is routed by Carrier node 610 which has an assigned value of ATX.

In accordance with the present invention, an output of PLDST 214 corresponding to the graph of FIG. 6 may be conceptualized using the following ASN.1 pseudo code specification. This ASN.1 pseudo code specification should be read in conjunction with the complete Interface Specification 222 as shown in Appendix A, particularly paragraph 24 which specifies the CvDecisionNode and paragraph 8 which describes the AssignmentNode.

```
010     Cprrecord::= {
020     entrypoint
030         entryPtKey: "DLN",
040         cprLogicPart {
050
060             {nodeId: 602,
070             childNode :,
080             CvDecisionNode :
090                 inputCv:$MDOW,
100                 decBranch
110                     childNode: 600,
120                     branchValue: 1, 5
130                 decBranch
140                     childNode: 610,
150                     branchValue: 6, 7}
160             {nodeid: 608,
170             childNode :–1,
180             AssignmentNode :
190                 outputCv: RPCARRIER:,
200                 expression: MCI}
210             {nodeid: 610,
220             childNode :–1,
230             AssignmentNode :
240                 outputCv: RPCARRIER:,
250                 expression: ATX}
260         }
270     }
```

Node 602 and branch boxes 604 correspond to a CvDecisionNode, which is specified on lines 060–150 above. The NodeId on line 060 is a code that PLDST 214 generates to identify a node. Each node in a CPR record has a NodeId that is unique to its associated CPR. The input call variable is shown on line 090 above. This call variable specifies that a decision is to be made depending on the value of $MDOW. The branch box 604 corresponds to lines 100–120 above. Line 120 specifies that the branch box 604 branch is to be executed when the value of the input call variable is in the range from 1–5 and line 110 specifies that the node with ID 608 is to be executed when the value is between 1 and 5. Similarly, lines 150 and 140 specify that the node with ID 610 is to be executed when the decision value is in the range 6–7.

Carrier node 608 corresponds to the node with ID 608 shown on lines 160–200 above. The node represented by lines 160–200 is an AssignmentNode that assigns the predefined call variable RpCarrier, which specifies the primary character, to be MCI. The childNode specification on line 170 is –1 because the node with ID 608 has no children.

Carrier node 610 corresponds to a node with ID 610 as shown in lines 210–250 above. The node with ID 610 sets the primary carrier to be ATX.

J. DATA COMMUNICATIONS MANAGER

As described above, the DCM 220 and 232 of the SMS 200 and SCP 202, respectively, add communication header information to a message to be transferred between the SMS 200 and SCP 202 and provide the necessary handshaking operations to establish the communication link.

To exchange information between an SMS 200 and an SCP 202, an SCP 202 requires reliable messaging. Reliable messaging provides the SCP 202 with command/response type interface. Reliable messaging is preferably implemented using an asynchronous message-based interface for transmitting commands, replies, and event reports between the SMS 200 and the SCP 202. Additionally, the SCP 202 which executes the CPR records must provide a queuing mechanism to store and forward messages when the execution application is not available. Reliable messaging needs to support the storage of outgoing messages when there is no connection to the creation environment for critical responses or unsolicited messages. After connection recovery, the SCP will transmit the storage messages and any new message would be stored and transmitted as first-in-first-out (FIFO) in order of priority.

Every message is assigned a code or category, a priority, and a queuing level. DCMs 220 and 232 use the code or category information for distribution of messages. The DCMs 220 ad 232 further use the priority information for processing messages according to an assigned priority level, and they use the queuing level for queuing any message when disconnected or in overload conditions. Messages are also assigned a transmit time-out, a response time-out, and a retry count. DCMs 220 and 232 use this information for retransmission of messages on error conditions or for notification after retry expirations.

The DCM uses the following communication headers, Version, Priority, Message identification number, Message destination identification, Message source identification, Message origination identification, Error code, and Message code.

The communication header and protocol data unit ASN.1 definition is identified by reference numeral 15 in the specification of Appendix A.

The priority code is used by reliable messaging to transport a message accordingly or to change the execution priority of a message in a remote machine. There are currently two priorities, critical and normal. If this code is zero, a default priority is used based on the message code. For example, a message with the priority set to critical will be transported as a critical priority message and will be executed accordingly.

The message identification number is used as a correlation between a request and its response message. The sender of a command generates a unique message ID which the receiver echoes in the response message. The sender of the request receiving the response can correlate the request with the response message. The first character of the message ID corresponds to the application that generated the message.

The message Destination/Source identifications uniquely identifies an AIN system element. It consists of Destination/Source system identifier and Destination/Source node CLLI (Common Language Location Identifier) code, or alternatively, a uniquely identifiable name for a remote application/node.

The Message Source/Origination identifications are the same as the Message Destination/Source identifications, but without a one character identifier for the application. This field is used by the application to send messages and identify an originator for this unsolicited message.

The message code identifies a receive message and its receiving process (queue) in the remote machine. This same code is also used to decode the application message in conjunction with the version code, if multiple versions are supported.

K. OTHER NODES

In accordance with the present invention, CPRs can also be created using two types of nodes not identified in Section I.2. above, User-Defined nodes and Table nodes.

1. User-Defined Nodes

User-Defined nodes are single nodes having an underlying graph or service associated therewith. Thus, a displayed representation of a User-Defined node will have the appearance of a single node even when that particular User-Defined node contains multiple predefined nodes. An operator creates the underlying graph and institutes the call processing of that underlying graph as a single, User-Defined node within an overlying graph.

When testing a CPR containing a User-Defined node, the highlighted branches will be shown coming in and out of the User-Defined node, without displaying the execution path of the multiple nodes within the User-Defined node. In the CPR record, however, a User-Defined node having multiple node entries is represented as the individual node entries, not as a single node. When validating a CPR, the User-Defined nodes are executed on the basis of the individual nodes within the User-Defined nodes. Thus, errors and warnings generated by the validation process are specific to a particular node within the User-Defined node.

Dependency data showing CPRs that use a particular User-Defined node is maintained. If there are one or more CPRs containing a particular User-Defined node, preferably that particular user-defined node may not be edited or deleted.

2. Table Nodes

INTABLE node—This node selects between two branches of a graph depending on whether a particular value in a particular row of a Table exists. The INTABLE node includes a search expression. This expression contains search criteria for locating the row, including the name of the table record, the name of the column, and the value to be located. Once the search is complete, the INTABLE node tests to see if the row was found (e.g., yes branch) or was not found (e.g., no branch). For example, before routing a call, an INTABLE node may check to see if the dialed number is listed in a Table of prohibited telephone numbers. If the INTABLE node finds the dialed number in the Table, service execution could then proceed to a node that terminates the phone call. The INTABLE node includes table record name, column name, manipulator, and row data value.

TABLE node—This node allows a user to determine whether or not a row exists in a Table that meets certain specified criteria, and, if a row exists, retrieve a value from one of the columns in that row. The retrieved data is used by nodes of a graph which follow the TABLE node. When no row of a Table matches the specified criteria, the TABLE node returns the value NULL.

A TABLE node has an associated call variable name, table name, column to retrieve from, column to search for, comparison manipulator, and search value. Preferable values for the retrieval and search columns are any valid column names within the specified Table. Preferable values for the manipulator are the same as for the INTABLE node. Preferable values for the search value field are any valid values for the search column (e.g., a string if the search column contains string data type information) or the name of a call variable (preceded by a dollar sign) whose value is of the same data type as the search column.

L. OSI MODEL

The OSI reference model divides the communication functions of an AIN system element into seven layers. These seven layers can be grouped into lower layers (layers 1–4) and upper layers (layers 5–7). The lower layers provide mechanisms for reliable data transfer, whereas the upper layers provide mechanisms for transferring information reliably between applications of the AIN system elements. The upper layers provide commonly required user services (such as data representation and dialogue control) over a reliable bit channel provided by the lower layers.

Since the standards for layers 1–3 (Physical, Link, and Network) were initially addressed by CCITT and IEEE, OSI adopted many of these technologies (e.g., X.25 and Local Area Networks), and provided a flexible framework for diverse transmission media.

The transport layer (layer 4) provides reliable cost effective data transport between the AIN system elements, independent of the network. Some of the transport layer functions include segmentation, checksum, multiplexing, flowcontrol, expedited data, and reliable data transfer.

The session layer (layer 5) adds structure to the transport connection by providing session control (full and half-duplex, token management), synchronization, activity management, and exception reporting functions.

The presentation layer (layer 6) exchanges data structures over the sessions provided by the session layer. This layer addresses data representation issues such as conversion, encryption, and compression.

The application layer (layer 7) contains common applications and Application Service Elements (ASEs) which are like common subroutines for developing individual applications. Examples of common applications include File Transfer Access and Management (FTAM) for file transfer, Message Handling Services (MHS) for electronic mail, and Directory Service (X.500) for name to address mapping. Examples of ASEs are Association Control Service Element (ACSE) for establishing and releasing connections, Remote Operations Service Element (ROSE) for managing request and reply interactions, Transaction Processing (TP) for coordinating distributed transactions, and Common Management Information Service Element (CMISE) for managing information in an object-oriented approach.

M. ASN.1 PRIMITIVE DATE TYPES

Some of the ASN.1 primitive data types are listed in the following table:

| PRIMITIVE TYPE | MEANING |
| --- | --- |
| INTEGER | Arbitrary length integer |
| BOOLEAN | TRUE or FALSE |
| BIT STRING | List of 0 or more bits |
| OCTET STRING | List of 0 or more bytes |
| ANY | Union of all types |
| NULL | No type at all |

| PRIMITIVE TYPE | MEANING |
| --- | --- |
| OBJECT IDENTIFIER | Object Name (e.g., a library) |

New data types can be defined using the type definition:

```
<typereference>::=<type>
``` as shown in the following example:

```
Size::=INTEGER
```

As a result of the above definition, the new data type "Size" is equivalent to the data type, INTEGER.

SEQUENCE and SEQUENCE OF Data Types. In ASN.1, an ordered list of types comprises a SEQUENCE. For example, the Request in the following example consists of three types of data:

```
Request::=SEQUENCE {
    recoperation INTEGER,
    spockid OCTET STRING,
    sdiversion INTEGER OPTIONAL
}
```

As shown, the range of the entire sequence is demarcated with brackets. Each data type may optionally be assigned a name (which must begin with a lower-case letter). Also, optional elements in the list can be identified by the keyword OPTIONAL, as shown for the last entry in the above example. The data type SEQUENCE OF is used to identify repetitions of a SEQUENCE.

SET and SET OF Data Types. An unordered set of values are defined using the data type SET. The SET data type is used the same way as the SEQUENCE type. The data type SET OF is used to identify repetitions of a SET.

CHOICE Data Type. The data type CHOICE is used to define a data type whose value can be one of several different types. For example, the following example defines Recid as cprrecordkey or valuelistname.

```
Recid::=CHOICE {
    cprrecordkey OCTET STRING,
    valuelistname OCTET STRING
}
```

ANY Data Type. In some cases, the specific data type required may not be known at the time the type definition is created. The ANY data type is used to define such data types. When the ANY data type appears, a value of any ASN.1-defined type, including complex SEQUENCEs or SETs may be used. The ANY data type can be used for the definition of rows in a valuelist table as in the following example:

```
Valuelisttable::=SEQUENCE {
    rowdescriptor SEQUENCE {
    . . .
```

```
},
rowvalue SEQUENCE OF ANY
```

Tagged Data Types. Since the purpose of ASN.1 is to describe information communicated between two systems in a representation-independent way, the type and value of the transmitted data must be preserved throughout the communication. In order to achieve this, a tag is assigned to every data type defined with ASN.1

An ASN.1 tag has two parts: a Class and an ID-Code. The ID-Code is a non-negative integer of arbitrary size. It identifies a particular data type within a Class.

There are four classes defined in ASN.1. They are: UNIVERSAL, APPLICATION, PRIVATE, and CONTEXT-SPECIFIC.

Tags are not necessarily unique. In some cases, it is possible to assign the same tag to two or more different data types.

The ASN.1 syntax used to convey the tagging information for the UNIVERSAL, APPLICATION, and PRIVATE classes is shown in the following examples:

```
Example 1::=[UNIVERSAL 22] OCTET STRING
Example 2::=[APPLICATION 10] INTEGER { red(0),
white(1),
    blue(2) }
Example 3::=[PRIVATE 3] OCTET STRING
```

The tag is specified within the square brackets. In the case of CONTEXT-SPECIFIC tags, the tags are used with each member of a constructor as in the following example:

```
RecId::=SEQUENCE {
    cprrecord [0] CprRecord OPTIONAL,
    valuelistRecord [1] ValuelistRecord OPTIONAL
```

The above specification associates a context-specific tag of 0 with the cprRecord element and a context-specific tag for 1 with the valuelistRecord element.

If the Class name is omitted, the CONTEXT-SPECIFIC is assumed as in the above specification of Recid. For example, the following two statements are equivalent:

```
fieldxx [CONTEXT-SPECIFIC 10] FieldDesc
fieldxx [10] FieldDesc
```

OPTIONAL and DEFAULT Keywords. Optional fields are identified by the OPTIONAL keyword and the default values for a field can be declared using the keyword DEFAULT as in the following examples:

```
field_id1 INTEGER OPTIONAL
field_id2 INTEGER DEFAULT 1
```

In the above example, a default value of 1 is assigned to field_id2.

Naming Conventions. The names of all data types in ASN.1, whether built-in or user defined must begin with an upper-case letter. Most data types defined by ASN.1 itself are written in all upper-case. Type names may contain letters, digits, or hyphens, but may not end with a hyphen or contain two consecutive hyphens. Data type names may not contain underscores. Comments start with "-" and end with either "-" or the end of line.

Specification of Allowed Values. Some data type definitions may be followed by a bracketed list of identifiers, each assigned to a particular value as in the following example:

```
Color::=INTEGER { red(0), white(1), blue(2) }
``` each identifier must begin with a lower-case letter, and may contain letters, digits, or hyphens.

ASN.1 Compiler Specific Information. Some information needed by the ASN.1 compiler may be included in a comments portion. This information may have to be represented differently when using different compilers. Following is a brief explanation of some notations used in the specifications:

Repeating Fields. Repeating fields are identified by the SEQUENCE OF keyword as shown in the following two examples:

```
cvType [0] SEQUENCE OF Expression -- REPEATING
columnDescriptor SEQUENCE OF SEQUENCE -- RE-
PEATING -- { ... }
```

If the field itself is defined as a sequence, then the "SEQUENCE OF" keyword must be followed by the SEQUENCE keyword as shown in the second example above.

Some compilers require you to identify the maximum number of repetitions. This is done using the keywords CMAP as shown in the following example:

```
cvType [0] SEQUENCE OF Expression -- CMAP struct[20] -
-
```

Specification of a maximum number of repetitions is not needed if the compiler can generate a linked list structure for the repeating field as in the case, for example, of a CP-1 compiler. For example, the following ASN.1 specification:

percentDecisionNode::=SEQUENCE OF SEQUENCE-REPEATING

```
-- {
    childNode INTEGER,
    percentOfTime INTEGER
}
``` generates the following C structure when using a CP-1 compiler.

```
typedef struct seqof_percentdecisionnode {
    struct seq_percentdecisionnode {
        long childNode;
        long percentOfTime;
    } item;
    struct seqof_percentdecisionnode *next;
} *percentdecisionnode_t;
```

Length of OCTET STRINGs. The length of an OCTET STRING is not explicitly specified in the ASN.1 Specification. Only the keyword "VAR LENGTH" is used to emphasize the variable length as shown in the following example:

```
cprRecordKey OCTET STRING -- VAR LENGTH --
```

A CP-1 compiler generates the following structure for the above Specification.

```
struct {
    char *octets;
    long length;
} cprRecordKey;
```

A fixed length OCTET string can be specified using the keyword CMAP in the CP-1 compiler as in the following example:

cprRecordKey OCTET STRING-CMKAP nts char[20]—

The keyword nts following CMAP is an abbreviation for the null terminated character string. The above specification results in the following C structure when using a CP-1 compiler.

```
char cprRecordKey[16];
```

The LOWTOK_STRUCT Keyword. The CDEF followed by the lowtok_struct keyword causes a CP-1 compiler to generate C structure names using lower-case letters as in the following example:

```
ISCPSDI DEFINITIONS::=
BEGIN
--CDEF lowtok struct
PDU::=SEQUENCE {
    ...
}
END
```

Without the lowtok_struct keyword, the compiler defaults the structure names to begin with upper-case letters.

The BEGIN and END Keywords. As shown in the previous example, the keywords BEGIN and END are used to start and end the module specification. Use of ANY Data Type. The ANY data type is used in the specification of a valuelist record as shown in the following:

```
Tabvalues::=SEQUENCE {
    rowDescriptor ColumnDescriptor,
    rowvalue ANY DEFINED BY --CMAP func vl_table --
rowDescriptor
}
```

The identifier vl_table following the CMAP and the func keywords is used to identify the user defined decode and encode routines for the field. In the above example, the user must supply the enc_vl_table (which encodes the rowValue field into the BER format) and dec_vl_table (which decodes the BER format into the rowValue field) routines.

Use of the GeneralizedTime Data Type. The special data type GeneralizedTime is used to specify time. For example, the following specification:

```
timeStamp ::= GeneralizedTime
``` gets mapped into the following C definition when using a CP-1 compiler:

```
abnltm_t timeStamp;
where the data type asnitm_t is defined by:
    typedef struct {
        int year;           /* full year, 4 digits */
        int month;          /* 1 to 12 */
        int day;            /* 1 to 31 */
        int hour;           /* 0 to 23 */
        int min;            /* 0 to 59 */
        int sec;            /* 0 to 59 */
        int tenthsec;       /* 0 to 9, tenths of seconds */
```

-continued

```
        int mdiff;          /* local time diff in minutes
        from
                            GMT, + or - */
    } asnltm_t;
```

N. SUMMARY

While there has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

APPENDIX

This Appendix describes an Interface Specification that is copyrighted subject matter of Bell Communications Research. A limited license is granted to anyone who requires a copy of the Interface Specification for purposes of understanding or analyzing the present invention, but no license is granted to make a copy for any other purposes, including making, using, or selling the claimed invention.

Interface Specification

The following is a hierarchical definition of the structure of CPRs, Tables, messages, and other types of information to be transmitted between a service creation and management environment and a serve execution environment in a preferred embodiment of the present invention. The first definition is that of the message structure. After that, the definitions appear in alphabetical order.

```
ISCPSDI    DEFINITIONS: :=
BEGIN

--1.  MESSAGE STRUCTURE

SDIPDU : := SEQUENCE {
     globalTransactionId           OCTET STRING    --CMAP char[20],
     currentTimeStamp              INTEGER,        --effective date
     message CHOICE {
          --  SPACE initiated Messages (SPACE --> MSAP)
          activationMessage             [1000] ActivationMessage,
          auditMessage                  [1001] AuditMessage,
          setTraceMessage               [1002] SetTraceMessage,
```

©BELLCORE 1992

```
        activateSSMessage              [1003] ActivateSSMessage,
        -- Response to SPACE initiated messages (MSAP -> SPACE)
        activationResponse             [1100] ActivationResponse,
        auditResponse                  [1101] AuditResponse,
        setTraceResponse               [1102] SetTraceResponse,
        activateSSResponse             [1103] ActivateSSResponse,
        -- Unsolicited messages (MSAP --> SPACE)
        traceData                      [1200] TraceData,
        dtmfMessage                    [1201] DtmfMessage,
        exceptionMessage               [1202] ExceptionMessage,
        endSSMessage                   [1203] EndSSMessage
    }
}

--2.  Activate Special Study Message

ActiveSSMessage     : := SEQUENCE {
    recOp INTEGER {
        deletess(0),               -- delete a special study
        addss(1)                   -- add a special study },
    ssId      OCTET STRING,        -- Special study id
    --   Only the following call variables are allowed in the following field:
    --   QSVKEY, QDIALEDNBR, QANI, QAC, QPIN, QLATA, QTCM, RPCARRIER, RPTRUNK_GP,
    --   RROUTNBR, CANNC1, ROUTPNBR and SPC
    trapField    OCTET STRING,     -- call variable on which to trap
    fieldSelection CHOICE {
        --   When telcomponent is specified, then component id and # of
        --   components must be specified.  For example, to get NPANXX,
        --   componentId is 12 and noOfComponents is 2.
        telComponent [0] SEQUENCE {
            componentId    INTEGER {0
```

```
                planid(1), natureofnumber(2),
                countrycode(11), npa(12), nxx(13), xxxx(14)
            }
            noOfComponents   INTEGER
        },
        --  subString is used to obtain a substring of a string.  For example, to
        --  get NPANXXX from a telephone, startIndex should be 1 and strLength 7.
        subString     [1] SEQUENCE {
            startIndex    INTEGER,
            strLength     INTEGER
            },
            noSelection [2] INTEGER -- no field selection specified.
        },
        trapFieldValue     OCTET STRING, -- trap field value
        trapLimit          [0] INTEGER, -- trap limit (call count)
        timeLimit          [1] INTEGER  -- time limit (delta time)
}

--3. Response to the ActivateSSMessage.
--
ActivateSSResponse : := SEQUENCE {
    err           INTEGER,      -- eror code, if any
    ssID          OCTET STRING  -- special studies id

}

--4. ActivationMessage

ActivationMessage : := SEQUENCE OF SEQUENCE {
    recOp    INTEGER {
        deleterec (0),    --   delete a CPR or valuelist
        addrec(1),        --   add a CPR or valuelist if it does not exist
        replacerec(2),    --   update a CPR or valuelist if it
```

```
                              --    exists, otherwise add it o the MSAP database
         updaterec(3),        --    update a CPR or valuelist if it exists
                              --    in the MSAP database
         inclupdate(4)        --    update part of a valuelist
                              --    incremental update cannot be made to a valuelist
                              --    if the definition of that valuelist has
                              --    changed since the last activation.
    },
    customerId            OCTET STRING,         --    used by DRS
    recordId              RecordId,             --    cprkey or valuelist name
    previousTimeStamp     INTEGER,              --    for incremental valuelist
                                                --    updates
    recordData CHOICE {
         cprRecord            [0] CprRecordInfo,       --    call processing record
         valuelistRecord      [1] ValuelistRecordInfo, --    valuelist table
         vlOperations         [2] SEQUENCE OF VlOperation
    }
}

--5. Response to the Activation message

ActivationResponse : := SEQUENCE OF SEQUENCE {
    err            INTEGER,          -- error code, if any
    recordId       RecordId,
    effectiveTime  INTEGER

}
```

--6. AddVlOperation

-- Note: The sequence of column values must be in the same order
--       as the column names in the valuelist.  Also, if n rows
--       are to be added there should be (n*m) ExplicitValues
--       where n is the number of columns in the valuelist.
AddVlOperation : := SEQUENCE OF SEQUENCE {
    columnValues   ExplicitValues
}

--7. AddViRow

-- Note: Add a row to the valuelist.  The number of items in rowvalues must be
--       equal to the number of columns in the valuelist.  Also, if the row that
--       matches the key already exists, the add operation will be rejected.
--
AddVlRow       : :=      SEQUENCE { valuelistName     VariableKey,    -- call variable or octet string
    columnValues      SEQUENCE OF SimpExpression

}

--   The value of 'expression' is assigned to the output call variable 'outputCv'.
--   The outputCv must be of same type as the expression most cases.
--   In some cases, an implicit conversion is done.  The allowed conversions
--   are identified by the following table:
--

```
--                          To
                Integer   String   Carrier   LATA    FLOAT
--
--    F  Integer    Y        Y        Y        Y       Y
--    R  String     Y        Y        Y        Y       N
--    O  Telephone  N        Y        N        N       N
--    M  Carrier    Y        Y        Y        N       N
--       LATA       Y        Y        N        Y       N
--       Float      Y        N        N        N       N
--

--8.  AssignmentNode

AssignmentNode : := SEQUENCE {
    outputCv      CallVariable,
    expression    Expression  -- value of this expression is assigned to outputCV

}

--9.  AuditData

--   Response to Audit message.  When auditType is "fullrecord",
--   CprRecord or ValuelistRecord is returned.  When it is "effectivedate,"
--   KeyListResponse is returned.  Otherwise, justRecordKeys is returned.
--

AuditData : := CHOICE {
    cprRecord         [0]     CprRecord ,               -- complete CPR
    valuelistRecord   [1]     ValuelistRecord ,         -- complete valuelist
    keyListResponse   [2]     KeyListResponse,          -- keys+effectivedate+...
    justRecordKeys    [3]     SEQUENCE OF OCTET STRING, -- array of record keys.
    outputFileNames   [4]     SEQUENCE OF OCTET STRING  -- array of file names.
}
```

--10. AuditMessage

-- Note: When auditType is 0, keyList is OPTIONAL (i.e., # of items in keyList
--       should be zero). For all other auditTypes, keyList must be provided.
--       Also, when recordType is 0, both sharedcpr and nonsharedcpr records
--       are selected.
--

```
AuditMessage : := SEQUENCE {
     recordType    INTEGER { cprrecord(0), valuelist(1) },
     -- following three types of audit are allowed:
     auditType     INTEGER {
          justrecordkeys(0),    -- all record keys are returned
          effectivedate(1),     -- return key+effective date
          fullrecord(2)         -- return the complete record
     },
     keys CHOICE {
          keyList    [0] SEQUENCE OF RecordId -- REPEATING --,
          keyRange   [1] SEQUENCE {
               fromKey   RecordId,
               toKey     RecordId
          }
     }
}
```

--11. AuditResponse

```
AuditResponse : :=CHOICE {
     auditListResponse [0] SEQUENCE OF SEQUENCE {
          err                INTEGER,          -- error code, if any
          recordResponses  AuditData
     }
     auditRangeResponse [1] SEQUENCE {
          err                INTEGER,          - error code, if any
          recordResponses SEQQUENCE OF AuditData
```

}
}

--12. CallVariable

-- Note: The field id used in Version 1.0 has been eliminated.
--         Individual fields are extracted using manipulators.

CallVariable : := SEQUENCE {
    callVariableName OCTET STRING -- VAR LENGTH--
}

-- Note: Used to define the columns in a valuelist.
--       The key column does not have to be the first column.
--       Also, multiple columns can be combined to form a composite key.
--

--13. ColumnDescriptor

```
ColumnDescriptor : := SEQUENCE OF SEQUENCE -- REPEATING -- {
    columnName          OCTET STRING   -- VAR LENGTH --,
    dataType            INTEGER{
        intvalue (0),        -- 4 byte integer
        asciistring (1),     -- ASCII string if max length 64
        doyvalue (2),        -- format: yyyymmdd
        todvalue (3),        -- format: hhmm
        dowvalue (4),        -- format: 1-7 (sunday-saturday)
        bitstr (5),          -- BIT STRING of max bits 32
        numericstring (6),   -- BCD digit string; MAX digits: 32
        telephone (7),       -- MAX digits: 32
        booleanvalue (12),   -- 1 for TRUE; 0 for FALSE
        carriervalue (13),   -- 3 BCD digits string
        latavalue (14),      -- 3 BCD digits string
```

```
}
--   fldLength must be in # of bytes allocated for the datatype.
--   It must be specified for asciistring and telephone
--   Default values used for other (see the enumeration)
     fldLength      [0]       INTEGER
                {
                intlength (4), doylength (4), todlength (2),
                dowlength (1), bitstrlength (4), booleanlength (1),
                carrierlength (3), latalength (3)
                } OPTIONAL
     keyFlag        [1]       INTEGER      { nonkey(0), key(1) } OPTIONAL
}

--14.  CommonDataPart

--   Common datapart used by cvDataPart and VldataPart
CommonDataPart : := SEQUENCE {
     -- call variable name or embedded valuelist name or measurement vector name
     callVariableName     OCTET STRING    -- VAR LENGTH --,
     dclOrDef             INTEGER         { dcl(0), defn(1) },
     cvScope              SEQUENCE {
          visibility INTEGER { globalMsap (0), globalCall (1), local (2) },
          extent INTEGER { persistent (0), nonpersistent (1) }
     }
}
```

--15. Communication Header

```
CommunicationHdr : := SEQUENCE {

--      Interface Version Number allowd values:
--      dcmver2 (0x00010200L), DCM version number
--      sdiver2 (0x00020200L), SDI version number
--      driver2 (0x00030200L)  DRI version number
version                 INTEGER,
priority                INTEGER,
messageId               OCTET STRING --CMAP nts char [11]--,
destNodeName            OCTET STRING --CMAP nts char [13]--,
srcNodeName             OCTET STRING --CMAP nts char [13]--,
originator              OCTET STRING --CMAP nts char [12]--,
errorCode               INTEGER {
        --      return an error code for
        --      an invalid message header
        invalid(1), badSource(2), badDestination(3),
        badVersion(4), badMessageCode(5)

}
messageCode             INTEGER {
        --DCM Messages Names--
        commgdy (10),           --      Keep Alive message (connect)
        commgnt (11),           --      good night message (disconnect)
        commfreq (20),          --      files transfer request
        commfrsp (21),          --      files transfer response
        commfmsg (22),          --      message in file
        commcnf (30),           --      message confirmation
```

```
-- SDI Messages Names
activationReq (1000),      --   activation message: delete,
                           --   add, update, replace a record
                           --   or incremental update to a
                           --   valuelist
auditReq(1001),            --   audit request
settraceReq (1002),        --   set trace flag request for a
                           --   CPR
activatesSSReq (1003),     --   activate a special study
activationRsp (1100),      --   MSAP response to activation
                           --   request
auditRsp (1101),           --   MSAP response to audit request
settraceRsp (1102)         --   MSAP response to set trace
                           --   request
activateSSRsp (1103),      --   MSAP response to a special study requests
tracedataRpt (1200),       --   trace data from MSAP to SPACE
dtmfupdateRpt (1201),      --   DTMF update message from MSAP
                           --   to SPACE
exceptionRpt (1202),       --   exception message from MSAP
                           --   to SPACE
endSSRpt (1203),           --   end of special study --DRI Messages Names--
sccs (100),                --   Start Customized Sample Study
ecss (101),                --   End Customized Sample Study
rcda (102),                --   Raw Call Data Attempt
rcdc (103),                --   Raw Call Data Completion
rasd (110),                --   Raw Application Sample Data
rssd (120),                --   Raw Special Study Data
scms (130),                --   Start Customer Measurement Study
ecms (131),                --   End Customer Measurement Study
rcmd (132),                --   Raw Customer Measurement Data
nss7 (140),                --   Raw Appl-oriented Meas Data -ss7
navg (141),                --   Raw appl-Oriented Meas Data - AVG
```

```
        nssp (142),          -- Raw Appl-Oriented Meas Data - SSP
        isia (150),          -- Indicate Status ISCP Application
        pfis (151),          -- Poll For ISCP Status
        pfid (160),          -- Poll For ISCP Data
        fabt (161),          -- Files Available for Bulk Transfer
        ftsd (162),          -- Files Transfer Successfully to DRS
        rlds (163),          -- Report Low Data Space
    }
}

--16.  Comparison Node

-- Note:  Only 2 branches allowed.  If comparison results in "True", the branch
--        identified by the "childNode will be taken.  Otherwise, the default
--        child in the "Node" structure will be taken.
--
ComparisonNode : := SEQUENCE {
    --    childnote must be -2 if the child note is undefined; otherwise should
    --    be a valid child note id in the range 0 to 32767.
    childNode        INTEGER {undefinedchild (-2) },
    input1           Expression,
    relOpr           INTEGER   {
        eq(0), gt(1), lt(2), ge(3), le(4), ne(5)
    },
    input2           Expression
}

--17.  Connect Node

-- Note:  The expression value is assigned to the routing number
--        call variable.
ConnectNode : := SEQUENCE {
    routingNumber    Expression
}
```

--18. CprDataPart

-- Note: CprDataPart can consist of the definition of (1) a call variable,
--        (2) embedded valuelist, or (3) measurement vector.
```
CprDataPart : := CHOICE {
      cvDataPart      [0]   CvDataPart,      -- call variable definition
      vlDataPart      [1]   VlDataPart,      -- valuelist definition
      mvDefinition    [2]   MvDefinition     -- measurement vector definition
}
```

--19. CPRRecord

```
CprRecord     : := SEQUENCE {
      recordKey          OCTET STRING,       -- CPR key
      cprRecordbody      CprRecordBody       -- CPR body
}
```

-- Note: Used for sharedcpr, nonsharedcpr and dtmfcprs. There can be
--       zero or more global dataparts and zero or more entrypoints.
--       epEchoField and CprEchoField can be of zero length.
--

--20. CprRecordBody

```
CprRecordBody : := SEQUENCE {
      testflag           INTEGER { sdiyes(1), sdino(0) }
      expirationTime     INTEGER,  -- trade expiration time (trace is
                                   -- collected till this time is reached)
dtmfTimeStamp            INTEGER,  -- Zero if updated is initiated by SPACE;
                                   -- else time of last DTMF update
      customerId         OCTET STRING, -- Customer id VAR Length
      globalDataPart     SEQUENCE OF CprDataPart, -- global data part
      --     entryPoint contains zero or more localDataParts and one or more
```

```
--    cprLogicParts.  Also, only call variable declaration allowed
--    in localDataPart.
    entryPoint SEQUENCE OF SEQUENCE -- REPEATING -- {
        entryPtKey    OCTET STRING -- VAR LENGTH --,
        localDataPart SEQUENCE OF -- REPEATING -- CvDataPart, -- local data part
        cprLogicPart  SEQUENCE OF -- REPEATING -- Node,
        epEchoField   OCTET STRING -- VAR LENGTH used by SPACE
    }
    cprEchoField    OCTET STRING -- VAR LENGTH used by SPACE
}

--21.  CprRecordInfo

CprRecordInfo : := CHOICE {
    shcprRecordBody    [0] CprRecordBody,  -- shared cpr
    nshcprRecordBody   [1] CprRecordBody,  -- non-shared cpr
    dtmfcprRecordBody  [2] CprRecordBody,  -- dtmf cpr
    cprTemplate        [3] CprTemplate,    -- cprtemplate
    gss                [4] Gss,            -- gss
    nodespec           [5] NodeSpec        -- node spec
}

--22.  CprTemplate

CprTemplate : := SEQUENCE {
    fld ANY
}

-- Note:  initialValue field must be specified if dclOrDef is 'defn'; however,
--        the value can be NULL.  Any hcange to persistent variable will result in
--        updating the CPR.  ALso, persistent variables must not be used for
--        maintaining counters.  Measurement vectors must be used instead.
--
```

--23. CvDataPart

```
CvDataPart : := SEQUENCE {
    commonDataPart CommonDataPart,
    dataType        [1] INTEGER           {
        intvalue (0),           -- 4 byte integer data
        asciistring (1),        -- ASCII string of max length 64
        doyvalue (2),           -- format: yyyymmdd
        todvalue (3),           -- format: hhmm
        downvalue (4),          -- format: 1-7 (sunday-saturday)
        bitstr (5),             -- BIT STRING of max length 4
        numericstring (6),      -- digit string: MAX digits: 32
        telephone (7),          -- MAX digits: 32
        booleanvalue (12),      -- 1 for TRUE; 0 for FALSE
        carriervalue (13),      -- 3 digits string
        latavalue (14)          -- digits string
    },
    --   fldLength must be in # of bytes allocated for the datatype.
    --   It must be specified for asciistring and telephone
    --   Default values used for others (see the enumeration)
    fldLength   [2]     INTEGER
        {
        intlength (4), doylength (4), todlength (2),
        dowlength (1), bitstrlength (4), booleanlength (1),
        carrierlength (3), latalength (3)
        } OPTIONAL,
    cvinitialValue          CvInitialValue       OPTIONAL
}
```

--24. CvDecisionNode

```
CvDecisionNode : := SEQUENCE {
    inputCv       Expression,    -- expression on which decision is made
    decBranch SEQUENCE OF SEQUENCE -- REPEATING -- {
    --    childnode must be -2 if the child node is undefined; otherwise should
    --    be a valid child node id in the rante 0 to 32767.
    --    It should not be a leaf node (-1).
    childNode         INTEGER {undefinedchild -2} },
    --
    --    0, 1 or 2 inputArgs can be specified.
    --    0 inputArgs implies match with NULL, 1 inputArgs implies EXACT match
    --    and 2 inputArgs imply range match
        branchValue SEQUENCE of SEQUENCE -- REPEATING -- {
            input Args SEQUENCE OF -- REPEATING -- EXPRESSION
        }
    }
}
-- Note:  The importId structure does not allow the use of call variable
--        for the cprRecordKey.  If such a need arises the loadcvNode should be
--        used in the graph to dynamically import a call variable from a
--        different graph.  Also, cannot import a local call variable.
--
```

--25. CvInitialValue

```
CvInitialValue : : = CHOICE {
    cvinitial     [0] SimpExpresion,
    importID      [1] OCTET STRING          --cprRecordKey
}
```

--26. DCMPDU

```
DCMPDU : : = SEQUENCE {
    communicationHdr  CommunicationHdr,
    anyMsg  ANY

}
```

--27. DeleteV1Operation

--    The following structure is used to delete a set of rows in a
          valuelist.
--    If whereQual is not specified, then all the rows in the valuelist
--    will be deleted. Otherwise, only the rows that satisfy the whereQual
      will be deleted.

--28. DeleteV1Operation

```
DeleteV1Operation : : = SEQUENCE {
   whereQual    WhereQual OPTIONAL
}
```

--    Note: If whereQual is not specified, then all rows in the valulist
          are deleted.
--    Also, if whereQual contain partial keys, then more than one row may
          deleted.

--29. DeleteV1Row

```
DeleteV1Row    : : =  SEQUENCE
    valuelistName     VariableKey, -- call variable or octet string
    whereQual         WhereQual OPTIONAL
}
```

--30. DtmfDataId

-- Identifies the DTMF variable to be changed.
--
```
DtmfDataId   : : = SEQUENCE {
    --   variableId is either: (1) call variable name, (2) the valueliskt
    --   column identifier in a standalone valuelist, or (3) embedded
    --   valuelist name and the valuelist column identifier in that embedded
    --   valuelist.
variableId CHOICE {
        callVariable       [0] Callvariable,
        standaloneValulist [1] ValuelistColId,
        embeddedValuelist  [2] SEQUENCE {
            valulist Name  OCTET STRING,        -- VAR LENGTH
            valuelistColId ValuelistColId
        }
},
oldValue    ExplicitValues,    -- old value of the variable
newValue    Explicitvalues     -- new value of the variable

}
```

--31. DtmfMessage

```
DtmfMessage  : : = SEQUENCE {
    globalTranId    OCTET STRING,        -- global transaction id,
    recordId        RecordId,            -- record key (CPR or valuelist)
    dtmfChangeTime  INTEGER,             -- time the change was processed in MSAP
    versionID       INTEGER,             -- version # for retrofit purposes
    dtmfDataId      SEQUENCE OF Dtmf     -- id of the data to be changed
                    DataId
}
```

--32. EndSSMessage

-- Message to indicate the end of special study from MSAP to SPACE
--
```
EndSSMessage : : = SEQUENCE {
     ssId           OCTET STRING,    -- special service id
     globalTranId  OCTET STRING     -- global transaction id identifying the ISCP
}
```

--33. ErrMsgParameters

-- The error message parameters could be used to dynamically construct an
-- appropriate error message
```
ErrMsgParameters   : : = CHOICE{
     cprId           [0] OCTET STRING,   -- cpr key
     valuelistName   [1] OCTET STRING,   -- valuelist name
     callVariable    [2] OCTET STRING,   -- call variable name
     OtherId         [3] OCTET STRING,   -- other parameters
```

--34. ExceptionMessage

-- Note: This message is generated by MSAP and sent to SPACE as an
-- unsolicited message. The error message parameters could be used
-- to dynamically construct an appropriate message (as in printf( )
-- function.
```
ExceptionMessage  : : = SEQUENCE {
     messageCode         INTEGER,       -- message id
     errMsgParameters SEQUENCE of ErrMsgParameters
}
```

--35. ExpDataTypes

```
ExpDataTypes   ::= CHOICE {
    intValue       [0] INTEGER,
    asciiString    [1] OCTET STRING   -- VAR LENGTH --,
    doyValue       [2] INTEGER,       -- day of year
                                      -- format: yyyymmdd
    todValue       [3] INTEGER,       -- time of day
                                      -- format: hhmm
    dowValue       [4] INTEGER,       -- day of week (1 - 7)
    bitStringValue [5] BIT STRING     -- VAR LENGTH (max 32)--,
    numericString  [6] OCTET STRING   -- VAR LENGTH BCD digit string--,
    telephone      [7] Telephone      -- VAR LENGTH--,
    booleanValue   [12] INTEGER   {sdifalse(0), sditrue(1) },
    carrierValue   [13] OCTET STRING -- 3 digits BCD string --,
    lataValue      [14] OCTET STRING -- 3 digits BCD string --,
    floatValue     [15] REAL --CMAP float--

}
```

--36. ExplicitValues

```
--  Note: same as the SimpExpression structure except that this does not
--        allow callVariable and manipulators.
--
ExplicitValues  :: -- SEQUENCE {
    nullIndicator    INTEGER    { nonnulldata(0), nulldata(1) },
    expDataTypes     ExpDataTypes
}
```

```
--37. Expression

Expression : : = CHOICE
    simpExpression   [0] SimpExpression,   -- simple expression
    vlExpression     [1] VlExpression      -- valuelist expression
}

--38. Generic Network Action Node

GenericActionNode : : = SEQUENCE {
    action          INTEGER,
    variables SEQUENCE OF SEQUENCE {
        cutputCv    VariableKey, -- call variable name
        expression  Expression  -- value of this expression is assigned to outputCv
    }
}

--39. Gss

Gss    : : = SEQUENCE { fld ANY
}

--40. HandoverNode

--   Note: entryPtKey can be defaulted to "main"
--
HandoverNode : : = SEQUENCE {
    cprRecordKey   VariableKey,   -- cpr Record key; can be an OCTET STRING
                                  -- or a call variable
    entryPtKey     VariableKey    -- entry point name; can be an OCTET STRING
                                  -- or a call variable
}
```

```
--41. KeylistResponse

--    Note:  noOfRows and noOfColumns are returned only for the valuelists
--           Only the "recordId" is present when audit request is the
--           of type: "justrecordkeys" (see alos AuditRequest).
--
KeyListResponse  : : = SEQUENCE of SEQUENCE {
    recordId        OCTET STRING,   -- VAR LENGTH  CPR key or valuelist
    activationTime  [0] INTEGER OPTIONAL,   -- effective date
    dtmfUpdateTime  [1] INTEGER OPTIONAL,   -- DTMF update time, if any (else 0).
    -- The following two are only for the valuelists.
    noOfRows        [2] INTEGER OPTIONAL,   -- rows in a valuelist
    noOfColumns     [3] INTEGER OPTIONAL    -- columns in a valuelist
}

--42. LoadCvNode

--    Note:  This node is used to dynamically import a call variable from a
--           graph.  Static import can be achieved in the datapart by specifying the
--           cprRecordKey in the initial value for the variable (see
--           CvInitialValue structure).  Also, cannot import a local call variable.
--
LoadCvNode  : : = SEQUENCE {
    importID        SEQUENCE {
        cprRecordKey        VariableKey, -- OCTET STRING or CallVariable
        callVariableName    VariableKey  -- OCTET STRING or CallVariable
    }
}
```

--43. MeasurementNode

-- Note: Measurement vector (identified by the mVectorName) must be defined
-- in the globaldatapart. ComponentId must be one of the valid components
-- identified in the definition of the measurement vector (MvDefinition)
--

```
MeasurementNode ::= SEQUENCE {
    mVectorName    VariableKey    -- VAR LENGTH --,
    componentId    VariableKey    -- id of the component --,
    --   You can assign an explicit value, increment the current value
    --   or decrement the current value.
    mVExpression   CHOICE {
        explicitValue        [0] INTEGER,
        mVectorManipulator   [1] INTEGER { increment(0), decrement(1) }
    }
}
```

--44. MvDefinition

-- Note: This defines the measurement vector.
--       The default measurementInterval is 300 seconds
--       There can be at most 10 components for a measurement
--       vector.

```
MvDefinition ::= SEQUENCE {
    commonDataPart CommonDataPart,
    componentId SEQUENCE OF OCTET STRING, -- VAR LENGTH REPEATING --   The measurementInterval should not be used in Version 2.0
    --   It is just a placeholder for future releases.
    measurementInterval SimpExpression OPTIONAL -- time in seconds
}
```

--45. Node

```
Node  : : = SEQUENCE {
    nodeSpecId          INTEGER,    -- used by SPACE only.
    nodeId              INTEGER,    -- number in the range 0 - 32767
    -- childnode can be a leafnode (-1), or undefinedchild (-2) if the child node
    -- is undefined; otherwise should be a valid child node id in the range
    -- 0 to 32767.
    childNode           INTEGER {leafnode(-1), undefinedchild (-2) }m
    simpleNode          CHOICE {
        assignment Node         [0] AssignmentNode,
        connect Node            [2] ConnectNode,
        terminateNode           [3] TerminateNode,
        playAnncAndCdNode       [4] PlayAnncAndCdNode,
        cvDecisionNode          [5] CvDecisionNode,
        percentDecisionNode     [6] PercentDecisionNode,
        comparisonNode          [7] ComparisonNode,
        handoverNode            [8] HandoverNode,
        transferCntlNode        [9] TransferCntlNode,
        samplingNode            [10] SamplingNode,
        measurementNode         [11] MeasurementNode,
        loadCvNode              [12] LoadCvNode -- for dynamically importing a cv

}
}
```

--46. PercentDecisionNode

```
PercentDecisionNode  : : = SEQUENCE OF SEQUENCE -- REPEATING -- {
    -- childnode must be -2 if the child node is undefined; otherwise should
    -- be a valid child node id in the range 0 to 32767.
    childNode           INTEGER { undefinedchild (-2) },
    percentage    Expression
}
```

--47. PlayAnncAndCdNode

--
PlayAnncAndCdNode : : = SEQUENCE {
    anncNumber      SimpExpression,
    numberOfDigits  SimpExpression
}

--48. RecordId

--   In order to improve the performance of accessing the records in MSAP,
--   the length of the fields in the following structure will be restricted
--   to 20 characters.
--
RecordId : : = CHOICE {
    cprRecordKey    [0] OCTET STRING -- VAR LENGTH --,
    valuelistName   [1] OCTET STRING -- VAR LENGTH --,
    templateName    [2] OCTET STRING -- VAR LENGTH --,
    gssName         [3] OCTET STRING -- VAR LENGTH --,
    nodespecName    [4] OCTET STRING -- VAR LENGTH --,
}

--49. SamplingNode

-- Sampling node id is considered using cprkey,
-- entrypointkey, nodename, effective date, etc.;
-- and is not part of the SDI message
SamplingNode : : = SEQUENCE {
    nodeName        OCTET STRING     -- VAR LENGTH --,
    sampleRate      INTEGER,         -- 0 to 100
    sampleType      INTEGER       { callattempt(0), callcompletion(1) },
    collectionFlag  INTEGER       { immediate(0), deferred(1) },
    -- efault value for the retentionPeriod is 3 days (or 259200 seconds)

```
        retentionPeriod    INTEGER OPTIONAL,    -- period in seconds
        samplingCvs        SEQUENCE OF CallVariable
}

--50.  SearchVlRow

--     Note:  Returns "sditrue" if the specified row exists, "sdifalse", otherwise.
--            Also, if whereQual is not specified, then returns "sditrue" if the
--            valuelist contains at least one row; 'sdifalse', otherwise.
--
SearchVlRow           : : = SEQUENCE {
       valuelistName        VariableKey,    -- call variable or octet string
       whereQual            WhereQual  OPTIONAL
}

--     Note:  The next row that matches the whereQual specified in the previous
--            select VlRow will be used to set the output call variables in
--            sourceAndTarget.  If no matching row is found, the output call
--            variables are not changed; but a value of "sdifalse" is returned.
--            If no selectVlRow was previously attempted, it is an error.  Also,
--            only one selectVlRow and selectNextVlRow can be active at any one
--            instance.  In other words, the following sequence results in an error:
--                selectVlRow("VL1",...);
--                selectVlRow("VL2",...);
--                selectnextVlRow("VL1");   This will return error.
--                selectnextVlRow("VL2");
--            Also, selectNextVlRow uses the same whereQual and sourceAndTarget
--            specified in the previous selectVlRow for the same valuelist
```

--51. SelectNextVlRow

```
SelectNextVlRow   : : = SEQUENCE {
    valuelistName      VariableKey  -- call variable or octet string
}
```

-- Note: The first row that matches the whereQual is used to update the output
--    call variables in sourceAndTarget. If no matching is found, the output
--    call variables are not changed; but a value of "sdifalse" is returned.
--    Also, next matching row can be selected using the selectNextVlRow manipulator.
--    Note also that sourceAndTarget can contain mroe than one output call
--    variable and more than one column.

--52. SelectVlRow

```
SelectVlRow   : : = SEQUENCE {
    valuelistName      VariableKey,    -- call variable or octet string
    sourceAndTarget    SourceAndTarget ,
    whereQual          WhereQual    OPTIONAL
}
```

--53. SetTraceMessage

-- Note: This message basically sets the expirationTime in the
--       cprRecord (see also CprRecordBody structure) to the value
--       specified in traceExpirationTime.

```
SetTraceMessage  : : = SEQUENCE {
    cprRecordKey         OCTET STRING  ,  -- CPR key
    traceExpirationTime  INTEGER          -- local time in seconds
}
```

--54. SetTraceResponse

```
SetTraceResponse  : : = SEQUENCE {
    err              INTEGER,          -- error code, if any
    cprRecordKey     OCTET STRING      -- CPR key
}
```

--55. SimpExpression

-- Note: same as the ExplicitValues structure except that it
--       allows callVariable and manipulator.
--

```
SimpExpression  : : = SEQUENCE {
    nullIndicator       INTEGER { nonnulldata (0), nulldata (1) },
    simpDataTypes       CHOICE {
      intValue        [0] INTEGER,
      asciiString     [1] OCTET STRING   -- VAR LENGTH --,
      doyValue        [2] INTEGER,       -- day of year
                                         -- format: yyyymmdd
      todValue        [3] INTEGER,       -- time of day
                                         -- format: hhmm
      dowValue        [4] INTEGER,       -- day of week (1 - 7)
      bitStringValue  [5] BIT STRING     -- VAR LENGTH (max 32)--,
      numericString   [6] OCTET STRING   -- VAR LENGTH BCD digit string --,
      telephone       [7] Telephone      -- VAR LENGTH--,
      callVariable    [8] Call Variable, -- call variable name
```

--56. Manipultor

-- Note: The telephonestr function is a function to explicitly convert
--    a string to telephone. In addition, some implicit conversions (e.g.,
--    from telephone to ascii is done as part of assignment (see assignmentNode
--    or comparison. Also, two manipulators, telecomponent and doycomponent are
--    provided to extract components of Telephone and doy data respectively

```
manipulator            [9] SEQUENCE {
  manipulationFn           INTEGER       {
    increment (0),           -- arg1: intValue/floatValue SimpExpression
    decrement (1),           -- arg1: intValue/floatValue SimpExpression
    abs (2),                 -- arg1: intValue/floatValue SimpExpression
    strlen (3),              -- arg1: asciiString/telephone SimpExpression
    add (4),                 -- arg1, arg2: intValue/floatValue SimpExpressions
    subtract (5),            -- arg1, arg2: intValue/floatValue SimpExpressions
    multiply (6),            -- arg1, arg2: intValue/floatValue SimpExpressions
    divide (7),              -- arg1, arg2: intValue/floatValue SimpExpressions
    substr (8),              -- arg1: asciiString/telephone SimpExpression,
                             -- arg2, arg3: intValue SimpExpressions
    and (9),                 -- arg1, arg2: bitstring SimpExpressions
    or (10),                 -- arg1, arg2: bitstring SimpExpressions
    xor (11),                -- arg1, arg2: bitstring SimpExpressions
    testbit (12),            -- arg1: bitstring SimpExpression
    opreq (13),              -- arg1, arg2: any two SimpExpressions
    oprgt (14),              -- arg1, arg2: any two SimpExpressions
    oprlt (15),              -- arg1, arg2: any two SimpExpressions
    oprge (16),              -- arg1, arg2: any two SimpExpressions
    oprle (17),              -- arg1, arg2: any two SimpExpressions
    oprne (18),              -- arg1, arg2: any two SimpExpressions
    lastdigits (19),         -- arg1: asciiString/telephone SimpExpression,
                             -- arg2 intValue SimpExpression
    telcomponent (20),       -- arg1: Telephone expression
                             -- arg2: componentid; allowed components:
                             --     planid(1), natureofnumber(2)
                             --     countrycode(11), npa(12), nxx(13), xxxx(14)
                             -- arg3: # of components: 1-4
    doycomponent (21),       -- arg1: DOY SimpExpression
                             -- arg2: componentid; allowed components:
                             --     yearpart(1), monthpart(2), daypart(3)
```

```
        concatenate (22),      -- arg1, arg2: asciiString SimpExpressions
        telephonestr (23),     -- arg1: String SimpExpression,
                               -- arg2: planid (integer SimpExpression)
                               -- arg3: natureOfNumber (integer SimpExpression)
        sqrt (24),             -- arg1: Integer/Float simpleExpression
        square (25)            -- arg1: Integer/Float simpleExpression
      }
      inputArgs          SEQUENCE OF -- REPEATING -- SimpExpression
    },
    booleanValue   [12] INTEGER  {sdifalse(0), sditrue(1)  },
    carrierValue   [13] OCTET STRING -- 3 BCD digits string --,
    lataValue      [14] OCTET STRING -- 3 BCD digits string --,
    floatValue     [15] REAL --CMAP float--
  }
}

--57.  SimpQual

-- Note:  This is used in a "where"qualifier of a valuelist expression.
--
SimpQual ::= SEQUENCE {
    columnName     OCTET STRING  -- VAR LENGTH --,
    relOpr         INTEGER  {
        eq(0), gt(1), lt(2), ge(3), le(4), ne(5)
    },
    expression     SimpExpression
}

--Note:  Used in the specification of the selectVlRow manipulator
--       in a valuelist expression.  The value of the source column is
--       assigned to the output call variable.
--
```

--58. SourceAndTarget

```
SourceAndTarget  ::= SEQUENCE OF SEQUENCE {
    sourceColumn   OCTET STRING, -- var length column in the valuelist
    outputCV       CallVariable  -- oiutput call variable
}
```

--59. Telephone

--Note: the countrycode is included in the "digits" field when the
--       natureOfNumber is "internaitonal"
```
Telephone ::= SEQUENCE {
    planId         INTEGER    -- numbering plan identification
        {
        notapplicable(0), isdnnumbering(1),
        telephony(2), datanumbering(3),
        telexnumbering(4), mobilenumbering(5),
        privatetelephone(14)
        },
    natureOfNumber INTEGER    -- nature of number
        {
        notapplicable(0), international(1),
        national(2), networkspecific(3)
        },
    digits         OCTET STRING  -- BCD digits; VAR LENGTH --
}
```

--60. TerminateNode

```
TerminateNode ::= SEQUENCE {
    anncNumber     SimpExpression
}
```

-- Note: nodeIndex now contains not only the node, but also the child
--       branch of the node that was selected.  The branch ids are
--       identified by numbers 0-n (or -1 if no child branch exists).  Also,
--       the global or local cvData do not contain the standalone valuelists.

--61.  TraceData

```
TraceData ::= SEQUENCE }
    err             INTEGER,
    errmsgparams SEQUENCE OF ErrMsgParameters ,
    recTraceData SEQUENCE OF SEQUENCE  {
    cprRecordKey        OCTET STRING -- VAR LENGTH --,
    timeStamp           INTEGER,
    nodeVisited SEQUENCE OF SEQUENCE {
       entryPtKey       OCTET STRING,
       nodeIndex        SEQUENCE OF SEQUENCE {
          nodeId        INTEGER,   -- valid node id
          branchId      INTEGER    -- valid branch id or -1
       },
       localCvData SEQUENCE OF SEQUENCE -- REPEATING -- {
          callVariable     OCTET STRING   -- VAR LENGTH --,
          dataValue CHOICE {
             callVariableValue  [0] ExplicitValues,
             embeddedValuelist  [1] SEQUENCE OF ExplicitValues,
             measurementVector  [2] SEQUENCE OF INTEGER
          }
       }
    }
  },
```

```
    globalCvData SEQUENCE OF SEQUENCE -- REPEATING -- {1
        callVariable    OCTET STRING -- VAR LENGTH --,
        explicitValues  ExplicitValues
    }
}
```

-- Note: entryPtKey can be defaulted to "main"
--

--62. TransferCntlNode

```
TransferCntlNode ::= SEQUENCE {
    cprRecordKey    VariableKey,    -- cpr Record key; can be an OCTET STRING
                                    -- or a call variable
    entryPtKey      VariableKey     -- entry point name; can be an OCTET STRING
                                    -- or a call variable
}
```

--63. UpdateVlOperation

-- Note: This is the same as the AddVlOperation; however, the row to be added
--       is first deleted from the valuelist. Error, if it does not exist.
```
UpdateVlOperation ::= SEQUENCE OF SEQUENCE {
    columnValues  ExplicitValues
}
```

--64. UpdateVlRow

-- Notes: (1) More than one column can be updated in a single operation.
--        (2) If whereQual is not specified, then all rows will be updated.
--        (3) If multiple rows match the whereQual, all matching rows will be updated
--        (4) Key columns cannot be updated.
--

```
UpdateVlRow     ::=  SEQUENCE {1
  valuelistName      VariableKey,   -- call varriable or octet string
  updateValues SEQUENCE OF SEQUENCE {
     columnName      OCTET STRING    -- VAR LENGTH --,
     columnValue     SimpExpression  -- This is the new column value
  },
   whereQual        WhereQual  OPTIONAL
}
```

--65. <u>ValuelistColId</u>

```
-- This structure identifies the column in a row of a valuelist.  It is used
-- update a specific column value.  If the column name is of length zero,
-- then it is assumed that the keyValues structure contains all the
-- column values for the row; and therefore, that row is added to the valuelist.
--
ValuelistColId  ::= SEQUENCE {
   -- column, the value of which is to be changed
   columnName     OCTET STRING,    -- VAR LENGTH
   keyValues    SEQUENCE OF SEQUENCE  {
     columnName  OCTET STRING,    -- VAR LENGTH   key column name
     columnValue Explicit Values  -- value of the key column
   }
}
```

--66. <u>ValuelistRecord</u>

```
ValuelistRecord      ::= SEQUENCE {
   recordKey             OCTET STRING,        --valuelistname
   valuelistRecordbody   ValuelistRecordInfo  --rest of valuelist
}
```

-- Notes: (1) The number of items in rowvalue must be equal to n*m where n is the
--       number of rows in the valuelist and m is the number of columns in the valuelist.
--          (2) The first value in rowvalue corresponds to 1st column, the second value
--       to the second column, (m+1)th value to the first column, and so on.
--          (3) The records must be sorted according to the key column values.
--          (4) useFlag will be defaulted to 0, if not specified.
--

--67.  ValuelistRecordInfo

```
ValuelistRecordInfo ::= SEQUENCE {
   dtmfTimeStamp     INTEGER,    -- Zero if updated by SPACE;
                                 -- else time of last DTMF update
   useFlag     INTEGER
      { saveinsharedmemory(0), saveindisk(1) } OPTIONAL,
   rowDescriptor    ColumnDescriptor,
   rowvalue         SEQUENCE OF ExpDataTypes
}
```

--68.  VariableKey

-- Note: This is the same as the SimpDataTypes; but restricted to
--       OCTET STRING and Call variable only.
```
VariableKey ::= CHOICE {
   asciiString     [1] OCTET STRING  -- VAR LENGTH --,
   callVariable    [8] CallVariable
}
```

--69.  VlDataPart

-- Note: maxRows must be specified for embedded valuelists
--       The columns in the valuelist are defined by the
--       ColumnDescriptor structure

```
VlDataPart    ::= SEQUENCE {1
    commonDataPart    CommonDataPart,
    dataType          INTEGER {embvaluelist(11)},
    valuelistName     OCTET STRING   -- VAR LENGTH --,
    maxRows           INTEGER,       -- max number of rows
    vlDefinition      ColumnDescriptor,
    initialValue      SEQUENCE OF ExpDataTypes
}
```

--70. VlExpression

```
-- Note: VlExpression contains the valuelist manipulators.
--       All of thse manipulators return a boolean value "sditrue" if the
--       manipulator is successful; "sdifalse" otherwise.
--       Also, the selectNextRow is used to get the next row
--       that satisfies the selection criteria specified in the
--       previous selectRow manipulator.
VlExpression ::- CHOICE   {
    searchVlRow       [11]    SearchVlRow,       -- find if a row exists
    searchVlRow       [12]    SelectVlRow,       -- select a set of columns of a row
    selectNextVlRow   [13]    SelectNextVlRow,   -- select a set of columns
                                                 -- from the next row
    addVlRow          [14]    AddVlRow,          -- add a row
    updateVLRow       [15]    UpdateVlRow,       -- update a set of rows
    deleteVlRow       [16]    Delete VlRow       -- delete a set of rows
}
```

--71. VlOperation

```
-- Note: The following structure is used to support incremental valuelist
--       updates.
```

```
VlOperation ::= CHOICE {1
    addVlOperation     [0] AddVlOperation,    -- add a set of rows
    deleteVlOperation  [1] DeleteVlOperation, -- delete a set of rows
    -- updateoperation [does the update if the records exist; otherwise,
    -- it is an error.
    updateVlOperation  [2] UpdateVlOperation
}
```

--72. WhereQual

```
-- Note: Used to specify the search condition for the valuelist manipulators.
--
WhereQual ::= SEQUENCE {
  simpQual SimpQual,
  compQual SEQUENCE OF SEQUENCE -- REPEATING -- {
    andOr    INTEGER    { andopr(0), oropr(1) },
    simpQual SimpQual
  }
}
```

We claim:

1. A method for controlling a telephone switching network including: a management processor having a graphics terminal for creating a graphical representation of a telephone service which is then stored in binary form as a call processing record, a control processor having a memory, a plurality of telephones each having a corresponding telephone number, and a switching system coupled to the plurality of telephones, the method comprising the steps, executed by the management processor of:

retrieving said call processing record;

translating said call processing record from binary form into data structure form;

encoding, in accordance with an interface specification, each data structure form of a call processing record into a machine independent data transfer syntax form;

sending the machine independent data transfer syntax form of the call processing record to the control processor;

wherein the method further comprises the steps, executed by the control processor, of:

receiving said machine independent data transfer syntax form of the call processing record;

decoding, in accordance with the interface specification, each of said machine independent data transfer syntax form of the call processing record received in the receiving step to generate a plurality of service procedures;

storing the plurality of service procedures in the memory;

detecting a telephone call;

selecting one of the plurality of service procedures stored in the memory according to a telephone number corresponding to the telephone call; and executing the selected service procedure to control the switching network.

2. The method of claim 1, wherein the decoding step includes the substeps of:

generating a service procedure including
a logic part having a plurality of instructions; and
a data storage part corresponding to the logic part, and wherein the executing step includes the substeps of reading an instruction from the logic part; and interpreting the instruction read in the reading step and writing data into the data storage part.

3. The method of claim 1, wherein the decoding step includes the substeps of:

generating a service procedure including
a logic part having a plurality of instructions, each instruction having a respective instruction identifier, one of the instructions containing the instruction indentifier of a subsequent instruction; and
a data storage part corresponding to the logic part, and
wherein the executing step includes the substeps of reading an instruction from the logic part; and interpreting the instruction read in the reading step and writing data into the data storage part.

4. The method of claim 1, wherein the decoding step includes the substeps of:

generating a service procedure including
a plurality of logic parts; and
a plurality of data storage parts, each data storage part corresponding to a respective logic part.

5. The method of claim 4, wherein the decoding step further includes the substep of:

generating the service procedure to include a common data part corresponding to each of the plurality of logic parts.

6. The method of claim 1, wherein the sending step includes the substep of:

embedding said machine independent data transfer syntax form of said call processing procedure in a message having a certain format; and sending the message.

7. A system for controlling a telephone network having a plurality of telephones, each telephone capable of originating a phone call, the system comprising:

graphical means for creating a call processing record for a customized telephone service;

means for encoding said call processing record, using an interface specification, into a plurality of memory structures;

means for sending the plurality of memory structures to a remotely located control processor;

means for receiving at said control processor a plurality of memory structures representing service procedures;

means for decoding, in accordance with the interface specification, each of the plurality of first memory structures received from the means for receiving to generate a plurality of service procedures;

means for storing the service procedures created by said means for decoding;

means, responsive to a telephone call originating from one of the telephones, for selecting one of the plurality of service procedures according to a telephone number identifying either a source or destination address of the telephone call;

means for executing the selected service procedure by writing a value to the memory location defined by the variable corresponding to the procedure and subsequently reading the memory location.

8. The system for controlling a telephone network of claim 7, wherein each of multiple ones of the plurality of service procedures defines a graph having nodes and branches; and wherein the executing means includes means for following a path in the graph.

9. The system of claim 7, further including means for generating a service procedure by processing a graph data structure; and means for sending the generated service procedure to the receiving means.

10. The system of claim 9, further including means for sending an audit message to the executing means.

11. The system of claim 7, further including means, responsive to one of the telephones, for changing a service procedure in the storing means.

12. The system of claim 7, wherein the system further includes means for receiving an audit message;

means for processing an audit message by sending a message indicating a content of the service procedure storing means.

13. A method of controlling a telephone switching network including: a management processor having a graphics terminal, a control processor having a memory, and a switching system coupled to a plurality of telephones, the method of comprising the steps, executed by the management processor of:

a first step of sending a plurality of table memory structures to the control processor, each table memory structure having a respective table identifier;

displaying a plurality of graphs on the graphics terminal;

encoding, in accordance with an interface specification each of the plurality of graphs to generate a plurality of first memory structures;

a second step of sending the plurality of first memory structures to the control processor;

wherein the method further comprises the steps, executed by the control processor of:

a first step of receiving the plurality of table memory structures sent in the first sending step;

a first step of storing the plurality of table memory structures, received in the first step, in the memory;

a third step of receiving the plurality of first memory structures sent in the sending step;

decoding, in accordance with the interface specification, each of the plurality of first memory structures received in the receiving step to generate a plurality of service procedures, one of the service procedures including an instruction having a table identifier;

a second step of storing the plurality of service procedures in the memory;

detecting a telephone call;

selecting one of the plurality of service procedures stored in the memory according to a telephone number identifying either the source or destination address of the telephone call; and executing the selected service procedure to control the switching network, including the substeps of recognizing the instruction having the table identifier, accessing a table memory structure stored in the first storing step, corresponding to the table identifier, and retrieving from said table memory structure information for executing said service procedure.

14. The method according to claim 13, wherein the second sending step includes the substeps of:

embedding one of the first memory structures in a message having a certain format; and sending the message.

15. The method according to claim 14, wherein the first sending step includes the substeps of:

embedding one of the table structures in another message having the certain structure; and sending the other message.

* * * * *